US008560426B2

(12) United States Patent
Lawrence

(10) Patent No.: US 8,560,426 B2
(45) Date of Patent: Oct. 15, 2013

(54) METHODS AND SYSTEMS FOR RETRIEVING DATA STORED IN DATABASE

(75) Inventor: David Lawrence, Manhasset, NY (US)

(73) Assignee: BGC Partners, Inc., New York, NY (US)

( * ) Notice: Subject to any disclaimer, the term of this patent is extended or adjusted under 35 U.S.C. 154(b) by 245 days.

(21) Appl. No.: 11/678,811

(22) Filed: Feb. 26, 2007

(65) Prior Publication Data
US 2007/0124167 A1    May 31, 2007

Related U.S. Application Data

(63) Continuation of application No. 10/990,575, filed on Nov. 17, 2004, now Pat. No. 7,310,051, which is a continuation of application No. 09/321,638, filed on May 28, 1999, now Pat. No. 6,876,309, which is a continuation of application No. 08/943,995, filed on Oct. 3, 1997, now Pat. No. 5,915,209, which is a continuation of application No. 08/342,809, filed on Nov. 21, 1994, now abandoned.

(51) Int. Cl.
*G06Q 40/00* (2006.01)

(52) U.S. Cl.
USPC .......................................................... 705/37

(58) Field of Classification Search
USPC ..................... 705/35, 37; 340/3.7, 825.26
See application file for complete search history.

(56) References Cited

U.S. PATENT DOCUMENTS

| 3,573,747 | A | * | 4/1971 | Adams et al. ................... 705/37 |
| 3,581,072 | A | | 5/1971 | Nymeyer |
| 3,598,308 | A | | 8/1971 | Garcia, Jr. |
| 3,610,920 | A | | 10/1971 | Frielinghaus |
| 3,660,652 | A | | 5/1972 | Staples et al. |
| 3,662,939 | A | | 5/1972 | Bryan |
| 3,865,380 | A | | 2/1975 | Thomas |
| 3,933,305 | A | | 1/1976 | Murphy |
| 4,122,308 | A | | 10/1978 | Weinberger et al. |
| 4,261,575 | A | | 4/1981 | Matthews et al. |
| 4,346,442 | A | | 8/1982 | Musmanno |
| 4,376,978 | A | | 3/1983 | Musmanno |
| 4,412,287 | A | | 10/1983 | Braddock, III |
| 4,554,418 | A | | 11/1985 | Toy |
| 4,567,359 | A | | 1/1986 | Lockwood |
| 4,674,044 | A | | 6/1987 | Kalmus et al. |
| 4,677,552 | A | | 6/1987 | Sibley, Jr. |
| 4,745,559 | A | | 5/1988 | Willis et al. |
| 4,750,135 | A | | 6/1988 | Bollen |

(Continued)

FOREIGN PATENT DOCUMENTS

| EP | 0370146 | 5/1990 |
| GB | 1489571 | 10/1977 |
| JP | 7-302287 | 11/1995 |

OTHER PUBLICATIONS

Aug. 19, 1993. Fabkom, Inc. "Municipal Trading System."*

(Continued)

*Primary Examiner* — Jason M Borlinghaus

(74) *Attorney, Agent, or Firm* — Glen R. Farbanish

(57) ABSTRACT

A computer-implemented, transaction-making, municipal bond trading system having a capability to conduct a private electronic auction of bid wanteds between a central brokers' broker and multiple prospective remote bidders and to maintain a reference database of accurate individual bond lot descriptions and identifications, including CUSIP (trademark) numbers.

68 Claims, 10 Drawing Sheets

(56) References Cited

U.S. PATENT DOCUMENTS

| | | | |
|---|---|---|---|
| 4,751,640 A | 6/1988 | Lucas et al. | |
| 4,789,928 A | 12/1988 | Fujisaki | |
| 4,799,156 A * | 1/1989 | Shavit et al. | 705/26 |
| 4,823,265 A | 4/1989 | Nelson | |
| 4,845,625 A | 7/1989 | Stannard | |
| 4,868,866 A | 9/1989 | Williams, Jr. | |
| 4,903,201 A | 2/1990 | Wagner | |
| 4,914,657 A | 4/1990 | Walter et al. | |
| 4,926,325 A | 5/1990 | Benton et al. | |
| 4,942,616 A | 7/1990 | Linstroth et al. | |
| 4,951,196 A | 8/1990 | Jackson | |
| 4,960,981 A | 10/1990 | Benton et al. | |
| 4,965,825 A | 10/1990 | Harvey et al. | |
| 4,992,940 A | 2/1991 | Dworkin | |
| 5,036,518 A | 7/1991 | Tseung | |
| 5,038,284 A | 8/1991 | Kramer | |
| 5,077,665 A | 12/1991 | Silverman et al. | |
| 5,093,794 A | 3/1992 | Howie et al. | |
| 5,101,353 A | 3/1992 | Lupien et al. | |
| 5,109,384 A | 4/1992 | Tseung | |
| 5,117,354 A | 5/1992 | Long et al. | |
| 5,136,501 A | 8/1992 | Silverman et al. | |
| 5,168,446 A | 12/1992 | Wiseman | |
| 5,191,613 A | 3/1993 | Graziano et al. | |
| 5,195,031 A | 3/1993 | Ordish | |
| 5,243,331 A * | 9/1993 | McCausland et al. | 345/172 |
| 5,243,515 A | 9/1993 | Lee | |
| 5,258,908 A | 11/1993 | Hartheimer et al. | |
| 5,283,731 A | 2/1994 | Lalonde et al. | |
| 5,289,578 A | 2/1994 | Hartheimer et al. | |
| 5,297,031 A | 3/1994 | Gutterman et al. | |
| 5,297,032 A | 3/1994 | Trojan et al. | |
| 5,305,200 A | 4/1994 | Hartheimer et al. | |
| 5,313,560 A | 5/1994 | Maruoka et al. | |
| 5,339,362 A | 8/1994 | Harris | |
| 5,339,392 A | 8/1994 | Risberg et al. | |
| 5,375,055 A | 12/1994 | Togher et al. | |
| 5,438,319 A | 8/1995 | Zeytoonijian et al. | |
| 5,493,692 A | 2/1996 | Theimer et al. | |
| 5,497,317 A | 3/1996 | Hawkins et al. | |
| 5,508,913 A | 4/1996 | Yamamoto et al. | |
| 5,517,406 A | 5/1996 | Harris et al. | |
| 5,535,383 A | 7/1996 | Gower | |
| 5,544,281 A | 8/1996 | Maruoka et al. | |
| 5,575,474 A | 11/1996 | Rossides | |
| 5,592,212 A | 1/1997 | Handelman | |
| 5,655,085 A | 8/1997 | Ryan et al. | |
| 5,664,111 A | 9/1997 | Nahan et al. | |
| 5,717,989 A * | 2/1998 | Tozzoli et al. | 705/37 |
| 5,724,524 A | 3/1998 | Hunt et al. | |
| 5,727,165 A | 3/1998 | Ordish et al. | |
| 5,732,400 A | 3/1998 | Mandler et al. | |
| 5,758,328 A | 5/1998 | Giovannoli | |
| 5,765,138 A | 6/1998 | Aycock et al. | |
| 5,774,877 A | 6/1998 | Patterson | |
| 5,790,677 A | 8/1998 | Fox et al. | |
| 5,793,301 A | 8/1998 | Patterson, Jr. et al. | |
| 5,797,002 A | 8/1998 | Patterson, Jr. et al. | |
| 5,802,493 A | 9/1998 | Sheflott et al. | |
| 5,806,050 A | 9/1998 | Shinn et al. | |
| 5,809,483 A | 9/1998 | Broka et al. | |
| 5,812,669 A | 9/1998 | Jenkins et al. | |
| 5,827,070 A | 10/1998 | Kershaw et al. | |
| 5,842,178 A | 11/1998 | Giovannoli | |
| 5,887,243 A | 3/1999 | Harvey et al. | |
| 5,895,465 A | 4/1999 | Guha | |
| 5,905,974 A | 5/1999 | Fraser et al. | |
| 5,915,209 A | 6/1999 | Lawrence | |
| 5,915,245 A | 6/1999 | Patterson, Jr. et al. | |
| 5,926,801 A | 7/1999 | Matsubara et al. | |
| 5,969,327 A | 10/1999 | Metlitsky et al. | |
| 5,970,479 A | 10/1999 | Shepard | |
| 5,986,655 A | 11/1999 | Chiu et al. | |
| 5,991,751 A | 11/1999 | Rivette et al. | |
| 5,995,947 A | 11/1999 | Fraser et al. | |
| 6,029,146 A | 2/2000 | Hawkins et al. | |
| 6,108,651 A | 8/2000 | Guha | |
| 6,112,188 A | 8/2000 | Hartnett | |
| 6,247,000 B1 | 6/2001 | Hawkins et al. | |
| 6,415,270 B1 | 7/2002 | Rackson et al. | |
| 6,496,838 B1 | 12/2002 | Zamora-McKelvy et al. | |
| 6,549,902 B1 | 4/2003 | Iwai | |
| 6,601,044 B1 | 7/2003 | Wallman | |
| 6,691,094 B1 | 2/2004 | Herschkorn | |
| 6,792,536 B1 | 9/2004 | Teppler | |
| 6,876,309 B1 | 4/2005 | Lawrence | |
| 6,895,507 B1 | 5/2005 | Teppler | |
| 6,898,709 B1 | 5/2005 | Teppler | |
| 6,934,868 B2 | 8/2005 | Morrison et al. | |
| 6,948,069 B1 | 9/2005 | Teppler | |
| 6,996,539 B1 | 2/2006 | Wallman | |
| 7,024,412 B1 | 4/2006 | Webb et al. | |
| 7,110,971 B2 | 9/2006 | Wallman | |
| 7,117,176 B2 | 10/2006 | Wallman | |
| 7,155,410 B1 | 12/2006 | Woodmansey et al. | |
| 7,165,045 B1 | 1/2007 | Kim-E | |
| 7,213,038 B2 | 5/2007 | Midgley | |
| 7,231,363 B1 | 6/2007 | Hughes et al. | |
| 7,310,051 B2 | 12/2007 | Lawrence | |
| 7,341,455 B2 | 3/2008 | Colaio et al. | |
| 7,555,282 B2 | 6/2009 | Lawrence | |
| 7,756,847 B2 | 7/2010 | Pauws et al. | |
| 2003/0046307 A1 | 3/2003 | Rivette et al. | |
| 2005/0243604 A1 | 11/2005 | Harken et al. | |
| 2005/0251533 A1 | 11/2005 | Harken et al. | |
| 2005/0256892 A1 | 11/2005 | Harken | |
| 2006/0179052 A1 | 8/2006 | Pauws et al. | |
| 2007/0106524 A1 | 5/2007 | Lawrence | |
| 2007/0118467 A1 | 5/2007 | Lawrence | |
| 2007/0118468 A1 | 5/2007 | Lawrence | |
| 2007/0118469 A1 | 5/2007 | Lawrence | |
| 2007/0124168 A1 | 5/2007 | Lawrence | |
| 2007/0150304 A1 | 6/2007 | Lawrence | |
| 2007/0208669 A1 | 9/2007 | Rivette et al. | |
| 2008/0071669 A1 | 3/2008 | Lawrence | |
| 2008/0077522 A1 | 3/2008 | Lawrence | |
| 2008/0243706 A1 | 10/2008 | Lawrence | |
| 2010/0030759 A1 | 2/2010 | Lawrence | |

OTHER PUBLICATIONS

Notice of Opposition in EP0625275, Jan. 16, 1998 (Published by the European Patent Office).

United States Patent and Trademark Office Action for U.S. Appl. No. 08/342,809, dated Oct. 28, 1996.

United States Patent and Trademark Office Action for U.S. Appl. No. 08/342,809, dated Jun. 3, 1997.

United States Patent and Trademark Office Action for U.S. Appl. No. 08/342,809, dated Oct. 18, 1997.

United States Patent and Trademark Office Action for U.S. Appl. No. 09/943,995, dated Apr. 22, 1998.

United States Patent and Trademark Notice of Allowance for U.S. Appl. No. 09/943,995, dated Sep. 15, 1998.

United States Patent and Trademark Office Action for U.S. Appl. No. 09/321,638, dated Dec. 6, 1999.

United States Patent and Trademark Office Action for U.S. Appl. No. 09/321,638, dated Mar. 21, 2001.

United States Patent and Trademark Advisory Action for U.S. Appl. No. 09/321,638, dated Jul. 2, 2001.

United States Patent and Trademark Office Action for U.S. Appl. No. 09/321,638, dated Aug. 30, 2001.

United States Patent and Trademark Office Action for U.S. Appl. No. 09/321,638, dated Aug. 5, 2002.

United States Patent and Trademark Office Action for U.S. Appl. No. 09/321,638, dated Mar. 21, 2003.

United States Patent and Trademark Advisory Action for U.S. Appl. No. 09/321,638, dated Nov. 26, 2003.

United States Patent and Trademark Advisory Action for U.S. Appl. No. 09/321,638, dated Apr. 2, 2004.

United States Patent and Trademark Advisory Action for U.S. Appl. No. 09/321,638, dated May 3, 2004.

(56) References Cited

OTHER PUBLICATIONS

United States Patent and Trademark Notice of Allowance for U.S. Appl. No. 09/321,638, dated Sep. 8, 2004.
United States Patent and Trademark Office Action for U.S. Appl. No. 10/990,575, dated Sep. 27, 2006.
United States Patent and Trademark Notice of Allowance for U.S. Appl. No. 10/990,575, dated Oct. 9, 2007.
United States Patent and Trademark Office Action for U.S. Appl. No. 11/678,835, dated Aug. 4, 2008.
United States Patent and Trademark Office Action for U.S. Appl. No. 11/946,297, dated Apr. 22, 2008.
United States Patent and Trademark Office Action for U.S. Appl. No. 11/538,644, dated Mar. 4, 2008.
Dong, Guozhu, "Knowledge Discovery in Database", Encyclopedia of Software Engineering, vol. 1, 2002, 2nd edition, pp. 704-712.
Hsu & Knoblock, "Semantic Query Optimization for Query Plans of Heterogeneous Multidatabase Systems", IEEE Transactions on Knowledge and Data Engineering vol. 16, #6, Nov. 2000, received Jul. 16, 1997.
SOTRM, Garcia-Arellano, Lightstone, Diao, & Surendra, "Adaptive Self Tuning Memory in DB2" VLDB Sep. 12, 2006.
"Public Notices," Journal Record, Oklahoma; Jun. 20, 2008; 3 pages.
U.S. PTO Office Action for U.S. Appl. No. 11/946,448; Apr. 23, 2008; 12 pages.
U.S. PTO Office Action for U.S. Appl. No. 11/946,448; Nov. 26, 2008; 14 pages.
U.S. PTO Office Action for U.S. Appl. No. 11/678,871; Dec. 09, 2008; 11 pages.
U.S. PTO Office Action for U.S. Appl. No. 11/690,441; Dec. 09, 2008; 18 pages.
U.S. PTO Office Action for U.S. Appl. No. 11/678,841; Dec. 10, 2008; 14 pages.
U.S. PTO Office Action for U.S. Appl. No. 11/678,811; Dec. 12, 2008; 16 pages.
U.S. PTO Office Action for U.S. Appl. No. 11/678,835; May 12, 2009; 10 pages.
U.S. PTO Office Action for U.S. Appl. No. 11/678,832; Aug. 18, 2009; 39 pages.
U.S. PTO Office Action for U.S. Appl. No. 11/678,832; Nov. 28, 2008; 15 pages.
U.S. PTO Office Action for U.S. Appl. No. 11/678,835; Nov. 30, 2009; 10 pages.
U.S. PTO Office Action for U.S. Appl. No. 11/678,841; Oct. 2, 2009; 21 pages.
U.S. PTO Office Action for U.S. Appl. No. 11/678,871; Oct. 2, 2009; 20 pages.
U.S. PTO Office Action for U.S. Appl. No. 11/690,441; Oct. 2, 2009; 21 pages.
U.S. PTO Office Action for U.S. Appl. No. 11/946,448; Oct. 7, 2009; 12 pages.
U.S. PTO Office Action for U.S. Appl. No. 12/041,333; Nov. 9, 2009; 11 pages.
U.S. PTO Office Action for U.S. Appl. No. 11/946,297; Dec. 21, 2010; 11 pages.
U.S. PTO Office Action for U.S. Appl. No. 11/678,841; Aug. 25, 2010; 24 pages.
U.S. PTO Office Action for U.S. Appl. No. 11/678,871; Sep. 2, 2010; 22 pages.
U.S. PTO Office Action for U.S. Appl. No. 12/041,333; Jul. 27, 2010; 8 pages.
U.S. PTO Office Action for U.S. Appl. No. 12/493,905; Aug. 20, 2010; 8 pages.
U.S. PTO Office Action for U.S. Appl. No. 11/678,835; Feb. 28, 2011; 10 pages.
U.S. PTO Office Action for U.S. Appl. No. 12/041,333; Mar. 31, 2011; 8 pages.
U.S. PTO Office Action for U.S. Appl. No. 12/493,905; May 12, 2011; 10 pages.
U.S. PTO Office Action for U.S. Appl. No. 11/946,448; May 26, 2011; 14 pages.
Pro Quest Easton Realty Auction Fizzles: Jack Kraft The Morning Call, Allentown Pa. Sep. 15, 1991, p. B03.
U.S. PTO Office Action for U.S. Appl. No. 11/678,841; May 19, 2011; 3 pages.
U.S. PTO Office Action for U.S. Appl. No. 11/678,871; May 19, 2011; 3 pages.
U.S. PTO Office Action for U.S. Appl. No. 11/678,835; Jun. 10, 2011; 11 pages.
Notice of Allowance for U.S. Appl. No. 11/678,811; Sep. 13, 2011; 9 pages.
U.S. PTO Office Action for U.S. Appl. No. 11/690,441; Sep. 29, 2011; 48 pages.
Notice of Allowance for U.S. Appl. No. 11/678,841, Mar. 8, 2012; 9 pages.
Notice of Allowance for U.S. Appl. No. 11/678,871, Mar. 9, 2012; 9 pages.
U.S. PTO Office Action for U.S. Appl. No. 11/946,448; Jan. 23, 2012; 18 pages.
U.S. PTO Office Action for U.S. Appl. No. 12/493,905; Feb. 29, 2012; 6 pages.
U.S. PTO Office Action for U.S. Appl. No. 11/678,835; May 9, 2012; 8 pages.
Notice of Allowability for U.S. Appl. No. 11/678,841, Apr. 25, 2012; 6 pages.
Notice of Allowability for U.S. Appl. No. 11/678,871, May 23, 2012; 8 pages.
Notice of Allowability for U.S. Appl. No. 11/678,871, Apr. 25, 2012; 6 pages.
U.S. PTO Office Action for U.S. Appl. No. 11/690,441; Jun. 21, 2012; 34 pages.
Notice of Allowability for U.S. Appl. No. 11/678,841, Aug. 16, 2012; 11 pages.
Notice of Allowability for U.S. Appl. No. 11/678,871, Aug. 16, 2012; 14 pages.
U.S. PTO Office Action for U.S. Appl. No. 12/041,333; Jul. 12, 2012; 8 pages.
U.S. PTO Office Action for U.S. Appl. No. 12/493,905; Sep. 18, 2012; 5 pages.
U.S. PTO Office Action for U.S. Appl. No. 11/946,297; Apr. 22, 2008; 12 pages.
Notice of Non-Compliant Amendment for U.S. Appl. No. 11/946,297; Dec. 23, 2008; 3 pages.
U.S. PTO Office Action for U.S. Appl. No. 11/946,297; Mar. 31, 2010; 13 pages.
U.S. PTO Office Action for U.S. Appl. No. 11/678,832; Aug. 13, 2009; 38 pages.
U.S. PTO Office Action for U.S. Appl. No. 11/538,644; Mar. 4, 2008; 7 pages.
Notice of Allowance for U.S. Appl. No. 11/538,644; May 5, 2009; 6 pages.
U.S. PTO Office Action for U.S. Appl. No. 11/678,832; May 14, 2013; 35 pages.
U.S. PTO Notice of Allowance for U.S. Appl. No. 11/678,835; Apr. 3, 2013; 7 pages.
U.S. PTO Office Action for U.S. Appl. No. 12/041,333; Apr. 9, 2013; 8 pages.
U.S. PTO Notice of Allowance for U.S. Appl. No. 11/946,297; Jun. 5, 2013; 10 pages.
U.S. PTO Notice of Allowance for U.S. Appl. No. 12/493,905; Jun. 4, 2013; 9 pages.
Notice of Allowance for U.S. Appl. No. 11/678,841; May 30, 2013; 10 pages.
U.S. PTO Notice of Allowance for U.S. Appl. No. 12/493,905; Jun. 12, 2013; 10 pages.
U.S. PTO Office Action for U.S. Appl. No. 11/690,441; May 22, 2013; 33 pages.

* cited by examiner

| File | Edit | Database | Municipal Bond Trading System 11/21/94 | | | | | Settlement Date: 11/28/94 | | | |
|------|------|----------|------|------|------|------|------|------|------|------|------|
| BidEntry | Bid Up | WNT | ForSale | Record | Sell | History | Buy | Reoffer | History | Utility | Window | Help |
| | | | | | | | | | | Calc | FaxSell | Menu |

| | | | | | | | Offerings | | | | |
|---|---|---|---|---|---|---|---|---|---|---|---|
| STSTR | 810 | NEW BRITAIN CT | MBIA | 4.00 | 2/1/98 | | CT | N/C | 4.700 | -1/4 | 64273YN8 |
| STSTR | 250 | NEW BRITAIN CT | MBIA | 4.20 | 2/1/99 | | CT | N/C | 4.800 | -1/4 | 64273VP3 |
| ABC-NY | 200 | CT SPEC TAX | | 7.125R | 6/1/01 | 101.00 | CT | MAT 6/1/07 | 5.350 | -1/4 | 207757HC2 |
| ABC-NY | 500 | CT SPEC TAX | | 6.400 | 8/1/02 | | CT | N/C | 5.500 | -1/4 | 207757HT5 |
| USSEC | 1300 | CT CLEAN WTR | | 6.750 | 1/1/04 | | CT | 01 at 102 | 5.500 | -1/4 | 207915AW9 |
| MESIROW | 450 | CT SPEC TAX | | 6.000 | 2/15/04 | | CT | 02 at 102 | 5.650 | -1/4 | 207757K27 |
| ABC-NY | 1000 | CT SPEC TAX | S.FGIC | 5.250 | 9/1/07 | | CT | N/C | 6.050 | -1/4 | 207757SF3 |
| 1ST CHIC | 1020 | CT | | 5.400 | 9/15/09 | | CT | N/C | 5.950 | | 207285Y2 |
| KIDBO | 1000 | CT HLTH BPT | MBIA | 6.500 | 7/1/12 | | CT | 02 at 102 04 at 100 | 6.300 | | 207742UG0 |
| ABC-NY | 845 | CT SPEC TAX | | 6.000 | 7/1/13 | | CT | 03 at 102 05 at 100 | 7.000 | | 207742CB8 |

Figure 7

| | | | | Municipal Bond Trading System | 11/21/94 | | 11/28/94 | | | |
|---|---|---|---|---|---|---|---|---|---|---|
| File | Edit | Datatbase | Record | History | | Utility | | Window | | Help |

| BidEntry | Bid Up | WNT | ForSale | Sell | Buy | Reoffer | History | Calc | FaxSell | Menu |

Offerings

| ABC | 3000 | CT SPL TAX | SFGIC | 4.40 | 10/1/97 | CT | N/C | 4.700 | −1/4 | 207757PN9 |
|---|---|---|---|---|---|---|---|---|---|---|
| ABC | 1500 | NH TPK | | 5.600 | 4/1/04 | NH | 02 at 102 | 5.500 | −1/4 | 644893CXC9 |
| ABC-BO | 260 | MASS IFA CLARK | | 6.100 | 1/1/98 | MA | N/C | 6.000 | −1/8 | 575914QM1 |
| ABC-BO | 275 | CHELSEA MASS | AMBAC | 5.200 | 6/15/01 | MA | N/C | 5.300 | −1/4 | 163303CK6 |
| ABC-BO | 950 | MASS WTR REV | | 5.700 | 11/1/02 | MA | N/C | 5.800 | −1/4 | 576049CW8 |
| ABC-BO | 430 | MASS WTR REV | | 6.500 | 12/1/03 | MA | 01 at 102 | 5.700 | −1/4 | 576049BS8 |
| ABC-NY | 200 | CT SPEC TAX | | 7.125R | 8/1/01 01.00 | CT | MAT 6/1/07 | 5.350 | | 207757HC2 |
| ABC-NY | 500 | CT SPEC TAX | | 6.400 | 8/1/02 | CT | N/C | 5.500 | −1/4 | 207757HT5 |
| ABC-NY | 1000 | CT SPEC TAX | SFGIC | 5.250 | 9/1/07 | CT | N/C | 6.050 | −1/4 | 207757SF3 |
| ABC-NY | 645 | CT H&E GRIFFIN | | 6.000 | 7/1/13 | CT | 03 at 102 | 05 at 100 | 7.000 | 207742C86 |

Figure 8

METHODS AND SYSTEMS FOR RETRIEVING DATA STORED IN DATABASE

CROSS-REFERENCE TO RELATED APPLICATIONS

This application is a continuation of U.S. patent application Ser. No. 10/990,575 filed Nov. 17, 2004, now U.S. Pat. No. 7,310,051 which is a continuation of U.S. patent application Ser. No. 09/321,638 filed May 28, 1999, now U.S. Pat. No. 6,876,309, which is a continuation of U.S. patent application Ser. No. 08/943,995 filed Oct. 3, 1997, now U.S. Pat. No. 5,915,209, which was a continuation of U.S. patent application Ser. No. 08/342,809 filed Nov. 21, 1994, now abandoned. Any patent, patent application or other document referred to herein is incorporated by reference into this patent application as part of the present disclosure, but only for purposes of written description and enablement.

BACKGROUND

The present application relates the retrieval of data stored in a database or as computer files. More particularly, the present application relates to methods and systems for searching or querying sequentially data stored in at least one database.

Bonds are interest-bearing securities issued by governments, government agencies and quasi-government agencies (municipal bonds), or by commercial corporations with the promise to repay the principal at a fixed future maturity date. The present invention is applicable to the trading of municipal bonds issued by state and local municipalities and with corporate and other securities traded in a comparable manner as will be apparent to those skilled in the art.

Securities brokers are licensed by the Securities and Exchange Commission to buy and sell, or trade in financial securities including commercial stocks and bonds and municipal bonds, on behalf of members of the public, for a commission. Any licensed securities broker can trade in bonds, separate licensing is not necessary, but some brokers specialize in particular types of bond. No formally organized exchange exists for trading bonds. When a securities broker needs to find a purchaser for a municipal bond to complete a sale for a selling customer or needs inventory of municipal bonds from which to make a purchase for a buying customer, the securities broker will generally go to a broker's broker who typically specializes in municipal bonds and deals only with other brokers, not with members of the public. Brokers' brokers, herein referred to as "municipal bond brokers" or simply "brokers," act on behalf of broker dealers, herein referred to as "traders," to maintain a market on a riskless and undisclosed basis. Traders are individuals who maintain and control a market within their firm for their sales people, but rely on brokers for transactions with the outside world, with what is known as the "street" market. Brokers maintain "books" of the highest bid a prospective purchaser is willing to make, herein referred to as "bids," and of the lowest "ask", or lowest price asked by a prospective selling trader, herein referred to as an "offering", on numerous different municipal bond issues. An offering is a relatively passive listing of an agency and lot as being available for sale at the asked price. An offering lacks urgency and immediacy and lists of offering are maintained as on-hand inventory by municipal bond brokers. When a client wishes to make a quick sale of a bond lot that fact is broadcast to prospective buying traders as a "bid wanted" for a limited period of time, typically a few hours, or a day or two at most, to solicit a high bid.

A trader, some firms have two or more traders, has the responsibility of maintaining inventory for a specific area of the municipal bond market, or type of bond, for example, insured bonds, short term maturity bonds, or long term maturity bonds. The bonds in inventory have a total position par amount known as the "position" of each lot and an offering par amount known as the "offer" or "offering" price. The position is an established price at which the bond lot was purchased and may be averaged across different prices for groups of bonds in the lot, for example, 10 bonds at 100, 20 bonds at 99½, and 30 bonds at 99 might constitute a lot of 60 bonds having a position price of 99.333, which is the average cost of each bond in the lot. An offering quotes a price at which the lot, or a part of the lot, is for sale for example, "25 at 99¾".

The function of a broker is that of both a buyer and a seller on every transaction, analogously to a wholesaler. The broker buys from a selling trader and sells to a buying trader. The broker obtains a firm bid before making a purchase from a seller and is therefore not at risk. The terms and parties to a municipal bond transaction are not publicly disclosed although the new purchaser is registered as proprietor of the lot with the issuer, and receives interest payments, calls and other notifications. The broker has no set "position" in the marketplace and is therefore able to be unbiased as to market direction.

Municipal bonds attract a wide following because of their tax-exempt status which also gives them a character of geographical interest. All such bonds are federally tax exempt and they are generally tax exempt under all superior jurisdictions. For example, New York City bonds are exempt from New York City, New York State and Federal income tax, but the interest on such bonds is likely to be taxable; that is, subject to state income taxes for out-of-state residents of, for example, New Jersey.

Because of the strictly geographical nature of the issuer, municipal bonds generally have a rather localized regional interest so that, for example, residents of the state of Oregon may well be interested in California bonds but will have little if any interest in bonds issued in Florida or New Jersey.

In the United States there are approximately one and one half million issues of such tax-exempt securities but there is no exchange through which they are traded and where a dynamic market can be made between willing sellers and willing buyers in competition with one another to determine a fair price for a given security having regard to all available information. Nor are there specialists for individual bonds or types of bonds as there are for commercial securities on stock exchanges. These commercial securities specialists are intimately familiar with the details of the securities in which they specialize and with relevant market forces, and are therefore able to handle their specialist securities more efficiently than can other traders.

Instead of using an exchange and product specialists, most municipal bond transactions are channeled through a small number of municipal broker's firms acting as brokers as described above. As of fall 1994, there are only twenty-one such firms in the U.S.A. One difficulty encountered by firms engaged in municipal bond sales is in obtaining accurate and up-to-date information on any one of over a million different bonds.

Various electronic information means exist to assist municipal bond brokers in trading municipal bonds. For example, some useful services are provided by brokers themselves whose function it is to match bids with bid wanteds as quickly and as profitably as possible. Brokers compete with one another to obtain bid wanteds from and to make deals with their clients, municipal bond traders. To attract and retain clients and to encourage the continuous use of brokers' services, some brokers make sophisticated information systems available to the traders.

A "Municipal Trading System" dated Aug. 19, 1993 from FABKOM, Inc., discloses a computer-implemented municipal trading system for in house use by municipal bond broker's brokers which assists their internal trading operations with outputs to proprietary information services such as Telerate (The Blue List Ticker), Munifacts, and Reuters (trademarks of their respective owners). The FABKOM Municipal Trading System does not solve the problem of rapidly communicating bid wanteds to large numbers of prospective bidders or to provide accurate up-to-date bond lot description information nor does FABKOM provide any new means for enhanced solicitation of bids from large numbers of potential buyers.

J.J. Kenny Drake provides a private, dedicated printer and optionally a screen in a trader's office. Such additional hardware can be problematical in the crowded office environment of many traders.

Another difficulty encountered by municipal bond brokerage firms attempting to consummate a substantial volume of trades quickly is that regulatory agencies prohibit brokers from making trades that are exclusively computer executed and require no physical intervention by a bidder to authorize the bid. Further, the authorization has to be related to an authenticated description of the security by a licensed professional. Unless there is voice-to-voice communication between buyer and seller, an exchange license is required.

Accordingly, there is a need for a system that can rapidly disseminate accurate, up-to-date information on any one of more than a million bond lots, to hundreds of potential buyers and can quickly solicit prospective buyers for the lot, identify a high bidder and to effect a profitable trade.

BRIEF SUMMARY OF THE INVENTION

The invention, as claimed, is intended to provide a remedy to the difficulties encountered by municipal bond brokers in obtaining accurate and detailed information on municipal bond lots and sales while the transactions are occurring. This problem is solved by providing a computerized municipal bond trading system having the capability to conduct a private electronic auction of bid wanteds between a central market-maker and multiple remote clients who are prospective bidders.

Preferably, bid wanteds included in the auction are rendered time-sensitive by including a time limit for receipt of bids by the market-maker. Transmission of bids to the market-maker from the bidders must be confidential so that bids are not disclosed to other bidders. In maintaining bid confidentiality, the system thus operates in a manner resembling a sealed bid auction such as is used for government contracting, albeit with a much smaller time scale. Preferably, also, each lot on which a bid is wanted is electronically transmitted or made available more or less simultaneously to all desired prospective bidders, for example, by using a fax service to broadcast a bid wanted, stamped with an auction deadline to hundreds of traders to solicit bids.

By broadcasting a large number of traders in a short period of time and constraining the solicitation of bid wanteds into the focused time frame of an auction, superior results can be obtained in that more traders respond more quickly and profitably, enabling the broker quickly to consummate a satisfactory sale for a selling trader.

Preferably, the system includes a security master database of reference material, preferably refreshed nightly from a reference database, from which the accuracy of broadcast bond lot descriptions and identifications can be verified, corrected and supplemented, if necessary, enabling a broker to circulate bid wanteds with up-to-date accurate descriptions.

Communication with client traders may be made directly to a client's workstation over a WAN, using known linking means such as wired or wireless links via modems, network interface cards transceivers and the like, or via facsimile, herein referred to as "fax," by out-putting in hard copy at the client's premises or into a computerized fax receiving device.

Bids can be transmitted from clients to the market-maker in any suitable manner. In a preferred embodiment they are transmitted by fax.

Direct electronic generation or input of bids by keyboard, mouse, stylus or other impersonal input device without employing a client's imprint is possible, in accordance with the invention.

Also, simultaneous transmissions by competing clients across a network can be rendered highly secure using known coding, routing and verification means, if desired. However, some clients may believe, with or without justification, that network-transmitted bids can be illicitly intercepted by competitors using computer-eavesdropping techniques such as those employed by "hackers."

BRIEF DESCRIPTION OF THE DRAWINGS

Some preferred embodiments of the invention, including the best mode contemplated of carrying out the invention, will now be described in detail herein below with reference to the accompanying drawings which illustrate only one specific embodiment of the invention and in which:

FIG. 7 shows a portion of a sample offerings listing from a database resident at a broker's office;

FIG. 8 shows a portion of a sample offerings listing from a database resident at a trader or customer's office.

DETAILED DESCRIPTION OF THE PREFERRED EMBODIMENTS

The present invention relates to a computerized system providing new ways of brokering municipal bonds, thus enabling municipal bond brokers to conduct business more efficiently and enabling a municipal bond brokerage (or "broker" hereinbelow) to provide a more efficient marketplace for bonds. It provides an in-house computer system employing novel computer-implemented brokerage software. The system could be implemented on a stand-alone or multi-user dumb terminal system, but is preferably implemented on a local area network, herein referred to as a "LAN." Enhanced embodiments of the system contemplate a wide area network, herein referred to as a "WAN," in which remotely situated trader customers can communicate across a digital network with a central brokerage house. An alternative embodiment of the invention is to register the municipal bond trading system as a licensed exchange with the Securities and Exchange Commission, hereinafter referred to as "SEC."

Pursuant to the invention, the broker (broker's broker or municipal bond specialist) compiles records of all offers received from various traders and firms into a central listing of offerings. "Offerings" which have not traded (because they did not receive their ask price) or low bids made against those offerings can be easily marked for inclusion in a silent auction pursuant to the invention as "bid wanteds". Such a "silent" auction is a novel and beneficial feature of the invention, not heretofore known in the industry.

Figure 1:
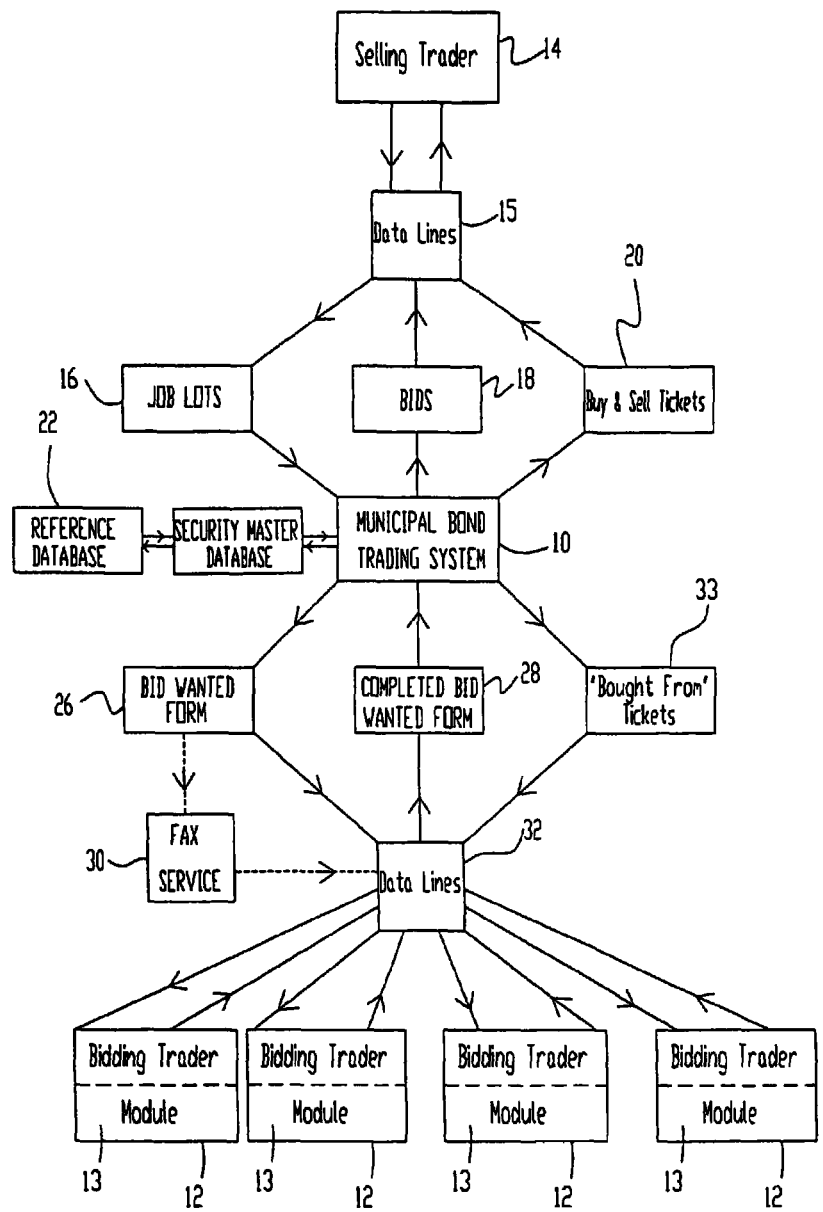
FIG. 1 is a schematic block diagram showing the flow of data between a bond selling trader and multiple buying traders linked via a municipal bond trading system according to the invention.

Traders participate in silent auctions, with secret bidding, and rely on brokers to run these silent auctions. Referring to FIG. 1, in a preferred embodiment such as that shown in the drawings, the invention comprises a software-enabled, computer-implemented municipal bond trading system 10 for use by SEC-registered municipal bond brokers firms to serve the community of SEC-registered securities brokerage firms who deal with the public, such as selling traders 14 and buying traders 12, for executing transactions in unlisted securities, especially municipal bonds, without disclosing the seller to the prospective buyer.

The municipal bond trading system 10 of the invention enables a broker who deploys it to perform a centralized market-making function in a manner providing many of the advantages of a live exchange such as the New York Stock Exchange, without, in preferred embodiments, requiring an exchange license.

Although the municipal bond trading system 10 is shown in FIG. 1 as occupying a central function between sellers such as selling trader 14 and buying traders 12, it is to be understood that this is a schematic representation, and as will be further explained hereinbelow, preferred embodiments of the municipal bond trading system 10 include components running at the premises of buying traders 12, and optionally, also at the premises of selling traders 14 to integrate both sellers and prospective buyers into a coherent market-making system.

Unlike, for example, the JJ Kenny-Drake McGraw Hill screen system, which places a dedicated printer or terminal in the office of a trader, the municipal bond trading system 10 of this invention can be implemented in PC-compatible software running on a trader's existing computer hardware employing major operating systems such as DOS (available in several versions, for example, from Microsoft Corp, IBM Corporation, Novell, Inc.), Windows (trademark, Microsoft Corp.), Apple Computer Corp.'s operating systems, and possibly IBM Corporation's OS/2 (trademark). This avoids interposing additional hardware into a trader's crowded work area, and permits a user to multi-task the municipal bond trading system 10 with other applications at the same workstation.

Preferably, the municipal bond trading system 10 uses operating system interrupts for the temporary insertion of time-sensitive screen messages or overlays when the user has other applications on-screen.

A job lot 16 comprises a list of one or more bond lots, each of which is a bid wanted, offering or a dollar bond quote. "For sale" is an industry phrase which means that a seller has accepted a bid at a level reasonably close to the lot's value and will execute on the bid.

A selling trader 14, who may be an owning institution or individual but is preferably an SEC-registered securities broker dealer, transmits one or more job lots 16 of bonds for sale to the municipal bond trading system 10 maintained by a broker, who functions as a "market-maker," at any time convenient to the selling trader 14. Transmission of job lots 16 to the municipal bond trading system 10 can be accomplished in any conventional manner; written, faxed, telephoned, or the equivalent, but is preferably electronically effected in a file that can be directly processed by the municipal bond trading system 10, for example, via confidential e-mail, as are communications from the market-maker to the seller, over data lines 15. Most preferably, the seller is computer-linked to the municipal bond trading system 10 on a LAN or a WAN.

Figure 1A:
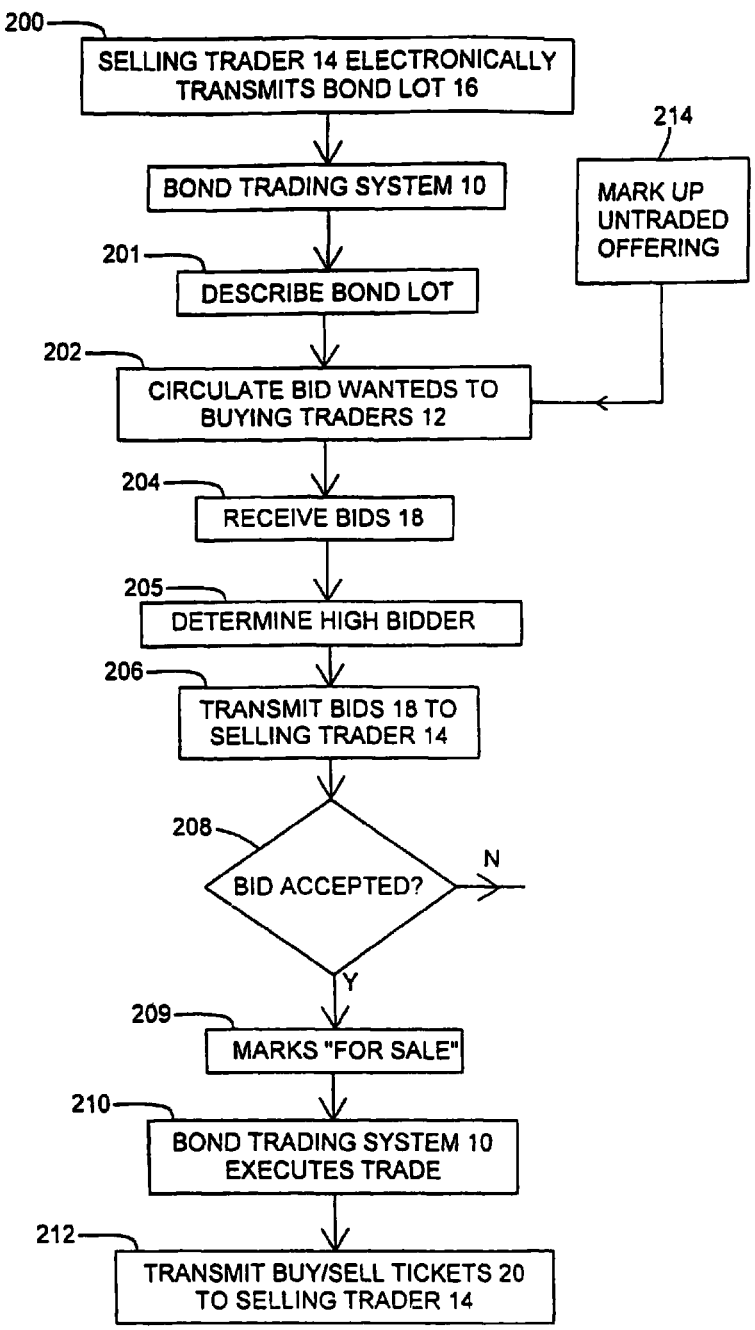
FIG. 1A is a schematic block flow diagram of a bond trade transaction performed by the bond trading system illustrated in FIG. 1.

Referring to FIG. 1A, after appropriate central processing employing the municipal bond trading system 10, bid wanteds are circulated to buying traders 12, Step 202, in order to solicit bids 18. These functions are described in greater detail herein below. Bids 18 are received by bond trading system 10 from one or more buying traders 12 and transmitted to the seller by any suitable means, such as fax or computer network, as described above, for further processing, Step 206. If the selling trader 14 accepts the bid 18, Step 208, the brokers' broker marks the lot "for sale," Step 209, and completes the execution, Step 210, preferably with the assistance of the municipal bond trading system 10, and then transmits customary buy and sell tickets 20, Step 212, to the selling trader 14 for their internal processing.

As described above, in Step 214, if desired, offerings which have not been traded can be marked up and included in Step 202 for circulation to buyers as bid wanteds.

If traders are utilizing the system on their workstations, they will execute a "buy" utilizing the program while the broker executes a "sell."

In a modified embodiment, subject to compliance with licensing requirements, the system can be operated as an exchange, providing a direct transaction between a selling trader 14 and a bidding trader 12, conducted through the intermediary of the trading system 10. The double step required in conducting a buy-sell transaction with both the selling trader 14 and the buying trader 12, can be eliminated. Alternatively, trading system 10 may receive bid wanteds in electronic form, without vocal communication, and system-select the best bid for entry and referral to the selling trader 14 for acceptance, which electronic non-vocal automated trading procedure currently requires an exchange license.

The system can be tailored to transmit information of the transaction to the trader's in-house processing system for proper record keeping and accounting and to maintain an inventory of bond lots in position for the trader.

It is the broker's responsibility to attempt, in a timely manner, to find a buyer for each lot in the job. Some institutions, for example, unit investment trusts, are required by regulation or their own constitutions, to have gone to every reasonable extent to have offered bonds to numerous brokers before completing a sale to the highest bidder. The novel municipal bond trading system 10 of the invention described herein facilitates fulfillment of this requirement by enabling rapid distribution of job lots 16 to a wide base of customers, selling traders 12, and by providing quick and efficient means for evaluating, collating and transmitting even a large number of bids 18 to the seller for further action.

Before a trade is executed, a municipal bond lot must be identified with a Central Unified Security Identification Process number, herein referred to as "CUSIP (trademark)" issue identification number. CUSIP is a registered trademark of the American Bankers Association ("ABA"). The bond lot must also have an authentic description and a par value, usually some thousands of dollars, describing the size of the lot. Unlisted bond descriptions are subject to change at any time. For example, bond ratings are continually changed by rating agencies, and a bond may be called in for repayment on as little as thirty days' notice. Ratings and calls are an essential part of the description of a security and can dramatically affect the character of the investment. It is accordingly highly desirable to include such changes of description in each bid wanted before distributing it, which presents a problem.

Failure to use a current and authentic description may require a disconcerting disclaimer to be included in the description, for example, "Not all calls may be listed." Such disclaimers are very undesirable sales characteristics and create uncertainties regarding completion of a trade to a high bidder.

Authentic descriptions are available from a reference database, such as the KENNYBASE (trademark) database maintained by Kenny Information Systems, Inc., which is often identified by the shorthand term "KIS." Reference herein to a "KIS database" or to "KIS" is to the KENNYBASE (trademark) database. However, the online access of such a reference database during a transaction is impractical due to its slow download time, the unwieldiness of the volume of data and the potential for incorrectly copied data.

To provide contemporaneous descriptions rapidly, in a manner suitable for processing lots in volume, the invention employs a security master database 24, wherein bond descriptions are stored cumulatively, whenever the municipal bond trading system 10 encounters them, to be available for future use. The security master database 24 can be primed or supplemented with preferred lists of bond descriptions and has no particular limits, but it is much smaller than the reference database 22, thus enabling a faster search and access capability. For municipal bond trading, the reference database 22 is preferably the KIS database. In a preferred embodiment, the structure of the security master database 24 is substantially matched to the fields in the reference database 22 and contains no additional fields, so that it may be purged of aged, inactive records without losing any historical transactional data or other useful data not available from the reference database 22.

The security master database 24 can be updated nightly from the reference database 22, to keep it within a day of the latest developments. Alternatively, other means may be used to maintain synchronicity of common data fields between the in-house security master database 24 and the remote reference database 22.

Each lot of a new job lot 16 is supplied with a description from the security master database 24, which can be rapidly retrieved over a LAN, WAN or similar network. If no description is present on the security master database 24, the description is pulled down directly from the reference database 22, which process is slower because of the relative database sizes, the time taken to make a remote connection, and possible queuing delays if the reference database 22 server is busy.

Similarly, identification numbers such as CUSIP (trademark) numbers, if not supplied by the seller, are furnished or verified from the security master database 24 based upon the seller's description, or, if not present on the house-controlled security master database 24, are obtained from the remote reference database 22 by searching on whatever descriptive parameters are furnished by the selling trader 14. These features of the municipal bond trading system 10 ensure that each bid wanted can be properly identified and authentically and contemporaneously described for distribution to customers, buying traders 12, Step 201 (FIG. 1A), in a bid wanted form 26.

Once prepared, the bid wanted form 26 is distributed to the buying traders 12 to enable them to bid in a timely manner. Bids are first solicited, and if necessary, collected centrally, and then evaluated to determine the high bidder, Step 205. Following this process, a compilation of bids is transmitted to the selling trader 14 for action.

According to the invention, these steps are accomplished in a silent auction, conducted electronically or on paper without the necessity of voiced person-to-person communication modes, such as telephone calls. In this silent auction, each bid wanted is provided with a bidding deadline and is broadcast to reach multiple buying traders 12 prior to that bidding deadline. Traders 12 wishing to bid on the lot offered are required to return a completed bid wanted form 28 to the central municipal bond trading system 10 prior to the deadline if the bid is to be considered. Bidding closes when the deadline passes. After acceptance of a high bid by the selling trader 14 and the completion of any closing formalities, a bought-from ticket 34 is system-prepared and transmitted to the buyer for their records and processing, preferably electronically.

An optional but valuable feature of the silent municipal bond auction according to this invention is the provision of timed alerts to warn of the approaching deadline. Preferably, bidding traders 12 are linked to the municipal bond trading system 10 over a computer network so that bidding deadline alerts can be overlaid, or otherwise displayed on a buying trader's screen at various times throughout the auction process to advise of the approaching commencement of an auction on a particular lot, to warn of expiration of the time limit, and to provide interim advisories as the auction proceeds. Such alerts are preferably displayed on a system-wide basis on all selected and operational networked screens including those of brokers working with other applications on-screen at the time. If desired, bidding trader modules 13 of the municipal bond trading system 10 software can include switches or filters permitting the user to choose which alerts should be flashed on-screen or which should be allowed to interrupt other applications.

Preferably, an on-screen bidding advisory message requires action by the bidding trader 12 to remove it, such as pressing a particular key, and the advisory may include options, for example, "Display bid wanted form?", if the form is not already on-screen.

Audible signals or messages may accompany or replace the displayed alerts. For example, distinctive musical chords may signify different stages of the bidding process and voiced messages may be sent to traders having digital sound capabilities. Sound alone is probably not satisfactory since an audible signal will not be received by traders who are away from their screens. A small residual screen box, for example, can give a trader the opportunity to playback a missed audible message to which they had failed to provide a requested response.

In a preferred display protocol, by way of example, an alerting message is distributed fifteen minutes before the commencement of an auction when bids are due. Then, fifteen minutes after an auction commences, if no bids have been reported to the selling trader 14, a message such as "Bids Not Up!" can be distributed. Other similar messages can be distributed at fifteen and five minutes prior to a deadline. Such alerts can be accompanied by full or abbreviated descriptions of the offered lot for which a bid is wanted.

The invention also enables a seller to place a job on "Hold" by setting it up in advance for bid wanteds. Such preparation could take as long as one-half hour or more for large jobs. This advance preparation enables the seller to wait for favorable market conditions and quickly respond to changes in conditions with a timely transmission of bid wanteds to the trading system 10.

The novel bond-lot auction procedure described herein provides a separate, quick, economical and efficient auction for each bid wanted or job lot offered. The process of disseminating bid wanteds and soliciting and collecting bids can be confined to a well-defined time frame. The onscreen bid deadline alerts command a trader's attention, have immediacy and focus a trader's attention on the bid wanted particulars. The invention significantly improves the volume and quality of responses received to a bid wanted and thence their profitability because traders can enter bids with their own equipment: a concept which is unique in the industry.

The municipal-bond marketing process is very competitive. Brokers compete for the time and attention of buying traders 12 and compete to produce results for the selling traders 14. The same trader may be a selling trader 14 on one trade and a bidding trader 12 on the next. Delays in distributing a bid wanted to a buying trader may lead to missed opportunities for the seller if the trader buys a different lot with comparable financials in the interim. Many selling traders 14 are sophisticated traders with ways and means of comparing the performance of the specialist municipal bond brokers to whom they entrust their bond lots for marketing.

A market-making municipal bond broker's performance is greatly enhanced by employing the inventive municipal bond trading system 10, because the broker can instantly transmit a complete and accurate bid wanted to a large number of traders simultaneously.

Some advantages of using the municipal bond trading system 10 are readily apparent in terms of more bids, shorter turnaround times between a seller's listing of a job lot with a broker using the municipal bond trading system 10 and receiving back an ordered list of bids received, fewer completion problems, and possibly better prices.

The problem of distributing bid wanteds to a specified number of buying traders 12 in a short time frame can be solved in various ways, but a particularly preferred solution utilizes fax transmissions of bid wanted forms 26 to a specified group of buying traders 12 who can receive the bid wanted form 26 on paper, by computer or in both ways. This method of transmission is also suitable for distributing bid wanted forms 26 to any individual buying trader 12. In preparing job lots 16 for fax broadcasting, the municipal bond trading system 10 organizes all active job lots 16 in a queue so that the broker can designate, or "tag," selected lots for faxing. The system sorts tagged lots for faxing by auction time, and sends them to a fax service 30 at a predetermined interval before the auction commences.

Fax distribution of job lots 16 can be effected by transmitting bid wanted forms 26 to a fax service 30, which then transmits appropriate fax messages to the specified list of buying traders 12 across data lines 32. Of course, in the case of fax transmissions, data lines 32 are telephone lines or telephone signal pathways. Most bid wanted forms 26 will be transmitted to at least tens, and more probably, hundreds of buying traders 12. In 1994, one list of such prospective buyers comprises nearly eight hundred names.

Preferably, to be functional in the municipal bond industry environment, a fax broadcast of bid wanteds should be completed within at least one hour and preferably in less time, for example, twenty or thirty minutes at the most in order to effectuate a timely auction and to be competitive with traditional distribution methods. Such traditional methods include; individually calling and faxing bid wanted forms 26 to preferred customers; broadcasting printouts to dedicated print terminals; and, other, similar methods. Such time constraints for fax broadcasting are presently prohibitive even for large offices with electronic access to multiple fax lines, when due allowance is made for individual connect and transmission times, data transfer rates over phone lines and for redialing busy numbers. The use of a commercial, external fax service, according to the invention, which employs one or more fax servers driving banks of out-calling modems to make many fax calls simultaneously, enables even small firms to compete more effectively by fax broadcasting. For example, MCI Communications, Inc. provides a fax service which is believed to have access to as many as four or five thousand modems and associated telecommunications network facilities. Such services can transmit large numbers of faxes more or less simultaneously and can, for example, meet a target for fax transmission of a one page message to five hundred traders within half an hour.

The fax broadcast method of bid wanted distribution described herein has multiple advantages of particular value to the sponsoring market-maker. No special equipment is required in the customer's office; every trader and broker has fax facilities. Faxed bid wanteds can be processed in hard copy or electronically, at the customer's discretion, fax broadcasting is the fastest available means of broadcasting bid wanteds to traders without making prior arrangements. And, most importantly, a faxed bid wanted form 26 with blank bid entry areas provides an ideal vehicle for returning completed bids, also by fax. Use of fax broadcasting greatly enhances the efficiency and commercial viability of the bid wanted auction system of the invention.

Preferably, and in addition to receiving faxed bid wanteds, a number of regular clients are computer networked with the municipal bond trading, system 10 to receive bid wanted forms 26 in compatible computer-processable format. If the network is used for returning a completed bid wanted form 28 to the central market-maker, it is preferred that a manual signature be entered on the completed bid wanted form 28 to authorize the bid.

Preferably, the bid wanted form 26 contains the full particulars of each bid wanted lot, including its CUSIP (trademark) number and description, state of origin, maturity, par amount, and coupon values (yield and concession particulars, net yields, and dollar, gross and net dollar price) if appropriate. For use in a fax-broadcast marketing system, the form preferably also includes blanks completable by a bidding trader with bid particulars, yield, dollar or other amount, as appropriate, and bidder identifiers, including the name of the bidding trader. Yields and other calculable numericals can of course be system-calculated and automatically posted from base data. A buying trader 12 can quickly write minimal bid information on a hard copy of such a bid wanted form 26, sign it, and fax it back to the market-maker, who receives a signed bid with full and accurate lot particulars complying with regulatory requirements and which does not need to be checked, verified or completed. Conventionally received bids are often incomplete, or inaccurate, and require confirmation.

Figure 2:
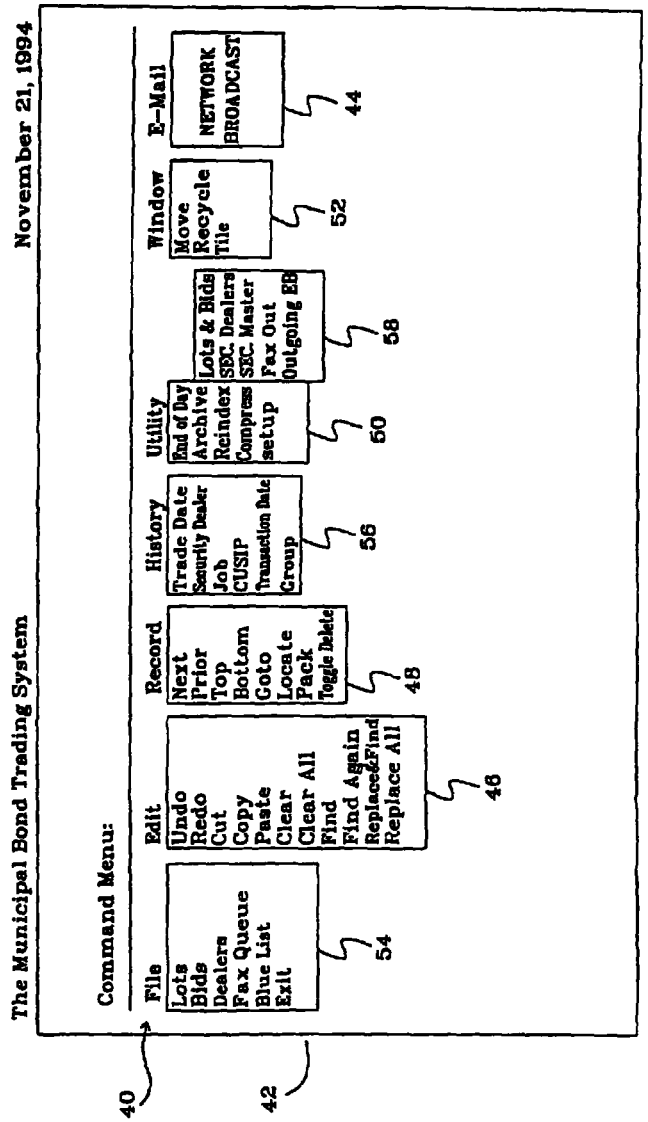
FIG. 2 is a schematic representation of a command menu screen for the municipal bond trading system shown and described with reference to FIG. 1.

The command menu screen shown in FIG. 2 comprises a conventional ribbon bar 40 across the top (or, if desired, the bottom) of a user's screen 42, from which drop-down menus can be activated, as shown. In general, the menu descriptions are customary ones for a database application; edit menu 46, record menu 48, utility menu 50, and window menu 52 all list conventional functions which are known to anyone familiar with database management programs. File menu 54, history menu 56, and archive selection menu 58 list choices of files and functions that are specific to the municipal bond trading system 10 of the invention. The bid wanteds selection highlighted on the file menu 54 initiates a procedure that associates lot records with their bidding status. Utility menu 50 utilizes an overlaid archive sub-menu 58 to present one or more archive functions. Referring to archive submenu 58, transaction activity is classified for storage in several different ways, as shown by the menu of selections such as "Lots & Bids" and so on. Archive functions permit historical records to be copied to tape, or other remote or backup permanent storage, enabling system storage capacity to be maintained by purging old records. Provision is made for storage (typically to hard disk) and archival of the host bond broker's daily system-generated transactions by selection of the Lots & Bids option, or to update the brokerage firm's home office records or the security master database 24 records, and to store a record of all outgoing faxes and E-mail using the "outgoing EB" function of archive submenu 58, which refers to outgoing e-mail broadcasts. The e-mail legend in e-mail window 44 describes a capability to send bid wanted forms 26 by e-mail, in automated mode to a predetermined destination list, which may be selected from multiple lists of buying traders 12, grouped according to their buying preferences, and networked with the municipal bond trading system 10. The remaining functions shown in FIG. 2 are standard or self-explanatory and will not be further described.

As indicated in menu box 44, the preferred embodiment shown employs an auto-open feature so that a time-sensitive bid wanted form sent via e-mail using this menu selection is promptly displayed on a buying trader's 12 screen, interrupting other applications if necessary.

Exemplary database structures for exemplary databases usable in practicing the invention including structures for the files listed in file menu 54 are set forth in the Database Table at the end of this specification.

Menu bar 40 can be present on some or all screens of the municipal bond trading system 10 software to provide users with a wide range of viewing and administrative functionality at any time. Following traditional database management practice, not all functions may be available from all software screens and available capabilities may be adjusted according to a user's status so that, for example, only an administrator can access utility menu 50.

Figure 3:
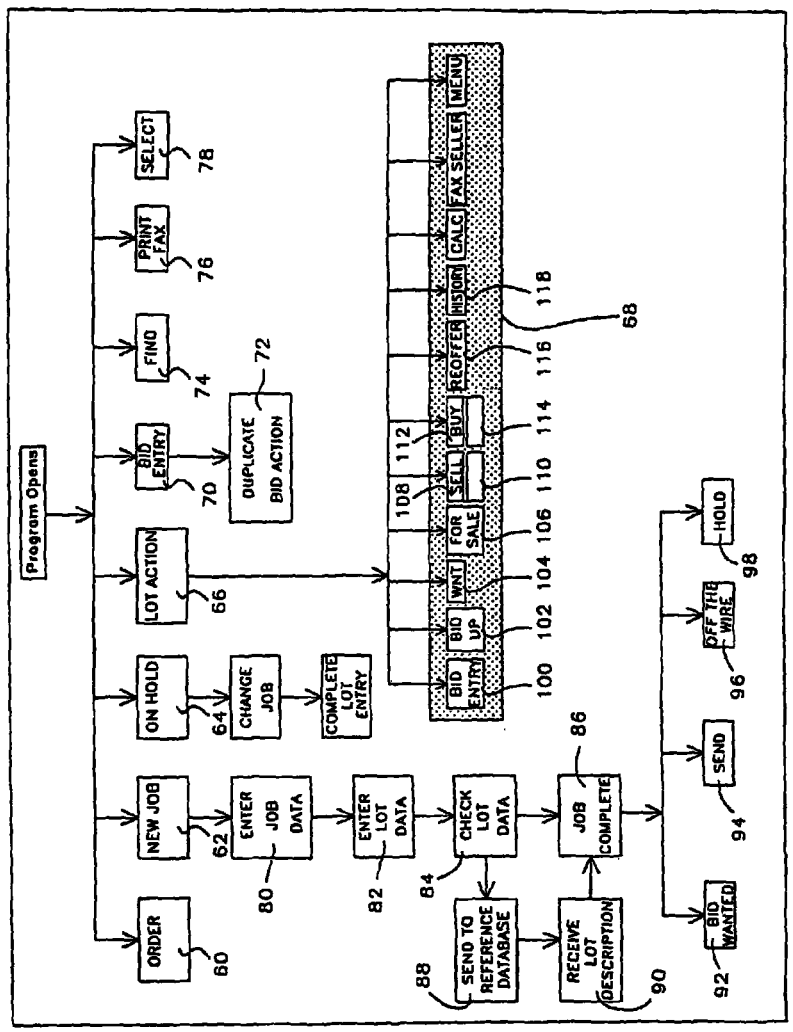
FIG. 3 is a block diagram showing one possible process flow of a user interface for the municipal bond trading described with reference to FIG. 1.

Referring to FIG. 3, multiple options are displayed when the municipal bond trading system 10 is opened, enabling a brokers' broker to conduct normal day-to-day municipal bond trading functions with the advantages described herein. The "ORDER" through "SELECT" functions across the top of FIG. 3 can be presented as a menu or a button bar of user selections or in any other convenient way. Each selection provides an input window or screen as will now be described.

The Order button 60 sets the order in which lots are viewed. Lot data is either electronically transmitted from a seller 14 or can be manually entered in a program button (not shown) or elsewhere. The New Job button 62 provides for job creation, lot data entry and verification, and permits selected actions to be taken on a newly created job. The On-Hold button 64 permits jobs to be put on hold during the new job entry procedure, and later returned to active status. The Lot Action button 66 opens a new Lot Action Button Bar 68, or menu, which enables a user to perform multiple actions on a lot. The Bid Entry button 70 provides for entry of bid details received from a buying trader 12 and for action on a bid.

With Lot Action Button Bar 68 open, the user's system can be said to be in a bid/offer state from which a desired trade sequence may be selected.

Duplicate Bid Action button 72 provides options in case multiple bids for the same lot are received from the same buying trader 12. The Find button 74 enables a trader to search all available lots in the database on a variety of user-selected criteria for example, yield, maturity, issuer, geography and the like. The Print/Fax button 76 permits selected lots information to be output from the system and can include formats, filters, styles and addresses to facilitate output, especially to provide a quick response to a buying trader 12. The Select button 78 enables a trader to create one or more private filters for use with the Find button 74 or the Print/Fax button 76.

Activating the New Job button 62 opens window 80, which enables a seller to post job data such as customer information identifying and describing the selling organization, as desired, trader information identifying the individual selling trader, the number of lots in the job, and time qualifiers for entry of the new job into a bid wanted auction. To facilitate data-entry, this information can be system-provided by selection from lists or by using defaults.

Window 82 provides for the entry of lot data including an identification number, notably, for municipal bonds, a CUSIP (trademark) number, and a par amount for each lot, representing the value of the lot at par, typically, for example, on the order of five or ten thousand dollars.

Window 84 permits the user to verify, complete, and update the lot data as necessary, and, if necessary, interrogates the remote reference database 22, in this case, the KIS server, for completion or authentication of data. Employing an issue-identifying CUSIP (trademark) number, the user or system checks the house-maintained security master database 24 and retrieves a full, authenticated issue description as downloaded (or updated or checked) the previous night from the reference database 22, the KIS server, and incorporates this description into the new job for itemizing in a bid wanted. Description retrieval can be effected with the usual speed of direct client access to a locally networked file server. If the CUSIP (trademark) description is found in the security master database 24, processing proceeds to the job complete window 86.

If the CUSIP (trademark) number is not in the security master database 24, an inquiry is placed in a lookup queue of the reference database 22, branch 88, to obtain an identification number using available bond issue description, and the full, up-to-date particulars including calls and ratings are received, logic block 90, returning to the job complete window 86.

A complete job can be acted on by the user in a number of ways, depending upon the nature of the job, as shown in the bottom row of buttons 92-98 in FIG. 3. If the job is a bid wanted, an auction is created specifically for that job, using the Bid Wanted button 92. If the job is a completed offering, dollar bond or auctionable bid wanted, ready for distribution, it can be dispatched for broadcast via the Send button 94 to the fax server, or to proprietary information services, for example, Kenny S&P's Blue List Bond Ticker, currently broadcast over Telerate, Reuters, and Bloomberg Information Services. Activating the Off-the-wire button 96 ensures that the relevant job lot 16 is not broadcast. Activating the Hold button 98 puts the job on hold for changes to be made or information to be added.

Bid wanteds broadcast to outside information services such as Kenny S&P's Blue List Bond Ticker can be indexed chronologically for delivery to customers or prospects with the latest lots listed first. Offerings and dollar bonds, which may not be time-sensitive, can be listed in any desired order.

Figure 5:
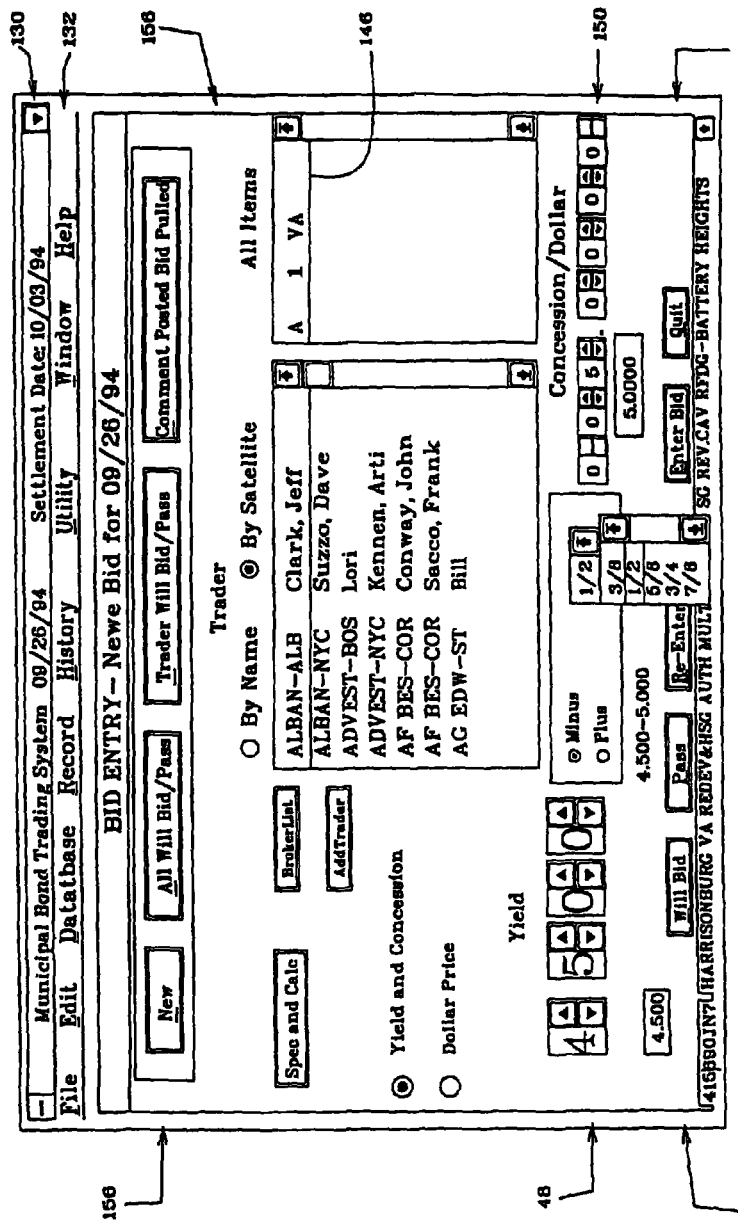
FIG. 5 shows a sample bid entry screen analogous to the bond lot data entry screen of FIG. 4.

Referring to the Lot-action-button Bar 68, the Bid-entry button 100 accesses the bid entry screen of FIG. 5. The bid entry screen is accessible from both button bars because some users will not have access to the lot action bar, such as administrative assistants clerks, and the like. The Bid-up button 102 marks the record of a job lot 16 as bid up to the seller meaning that one or more bids have been received and sent to seller 14 whose action is awaited. The "Will Not Trade" ("WNT") button 104 marks the record as "Will Not Trade" when the seller has decided not to sell because bids received are too low, or for any other reason. Options marking the record as priced, that is, offered, or not priced, or traded away, if the lot has been sold through other channels, can be added if desired.

For Sale button 106 marks the job lot record accordingly whenever a bid is accepted and execution will take place. Sell button 108 executes a trade, marks a record as sold to the buying trader 12, and initiates routines to make a bought-from ticket 33 for faxing to the buying trader 12 for their internal processing; to report the transaction to transaction files, for example, in a nightly recap of activity; to display "SELL" and to cancel a "SELL" instruction; and, finally, the updated record can be copied to a new offerings file, with a query as to the price, to be re-offered.

Button 110 is a cancel-sell button enabling a trade to be canceled or bought back from a buying trader 12.

Buy button 112 marks a job lot record as bought; makes buy and sell tickets for fax to the seller for sending to their back office. Transaction records are updated. The Cancel-buy button 114 enables a buy to be canceled. All buys and sells file records can be exported to the broker's back office for processing and delivery of records.

Re-offer button 116 enables recently sold lots to automatically posted as a duplicate offering item with a reoffering price. History button 118 displays a history of items or lots by any desired parameters, for example, by CUSIP (trademark) number and trade date. Calc button 120 provides a calculator for trial calculations on a bond lot. Fax Seller button 122 sends a fax of auction results to seller 14 and Menu button 124 returns to command menu 40.

The bidding status of a bond lot record is equivalent to its trading state. Thus, selection of one of the buttons shown in FIG. 3, such as Bid Entry 100, Bid Up 102, Sell 108, Buy 114, Reoffer 116, on Lot Action Button Bar 68, puts the system in a state specific to that trading activity, as described hereinabove, i.e. a trade-specific state, or trading state, enabling the user to select a desired trading state from a plurality of available trade specific states.

Figure 4:
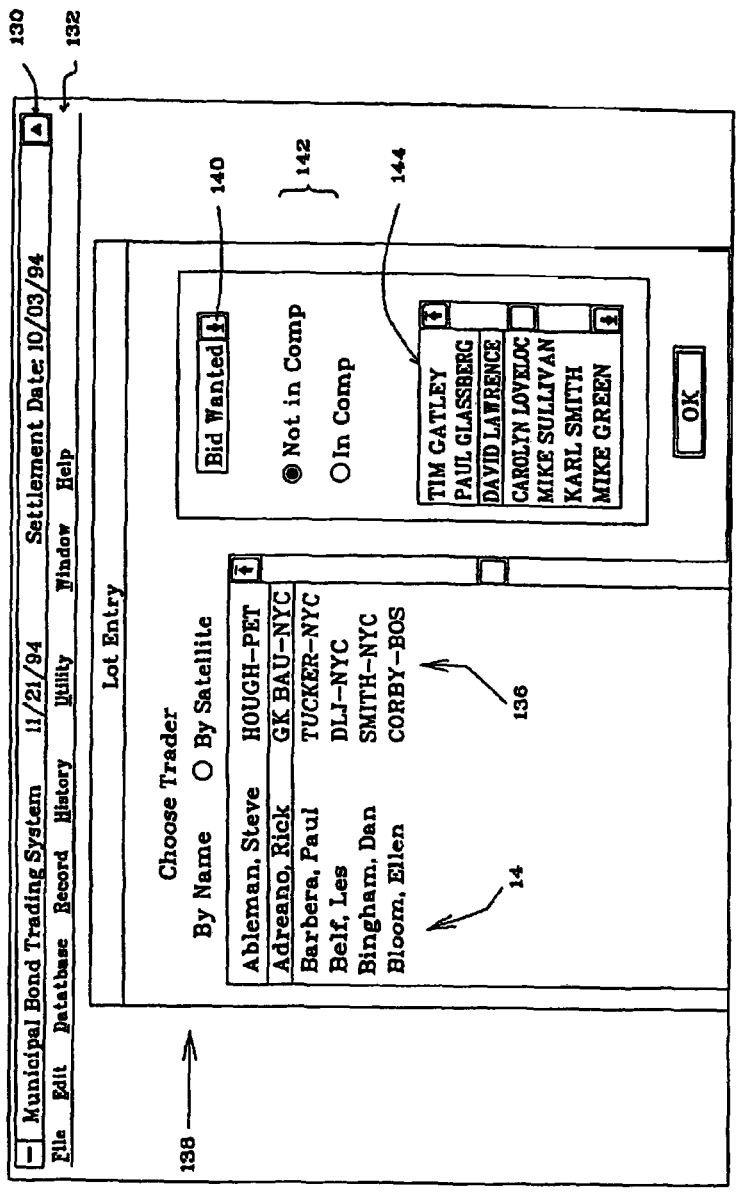
FIG. 4 shows a sample bond lot entry screen for posting bond lot data to a modified version of the trading system shown in FIGS. 1-3.
Figure 6:
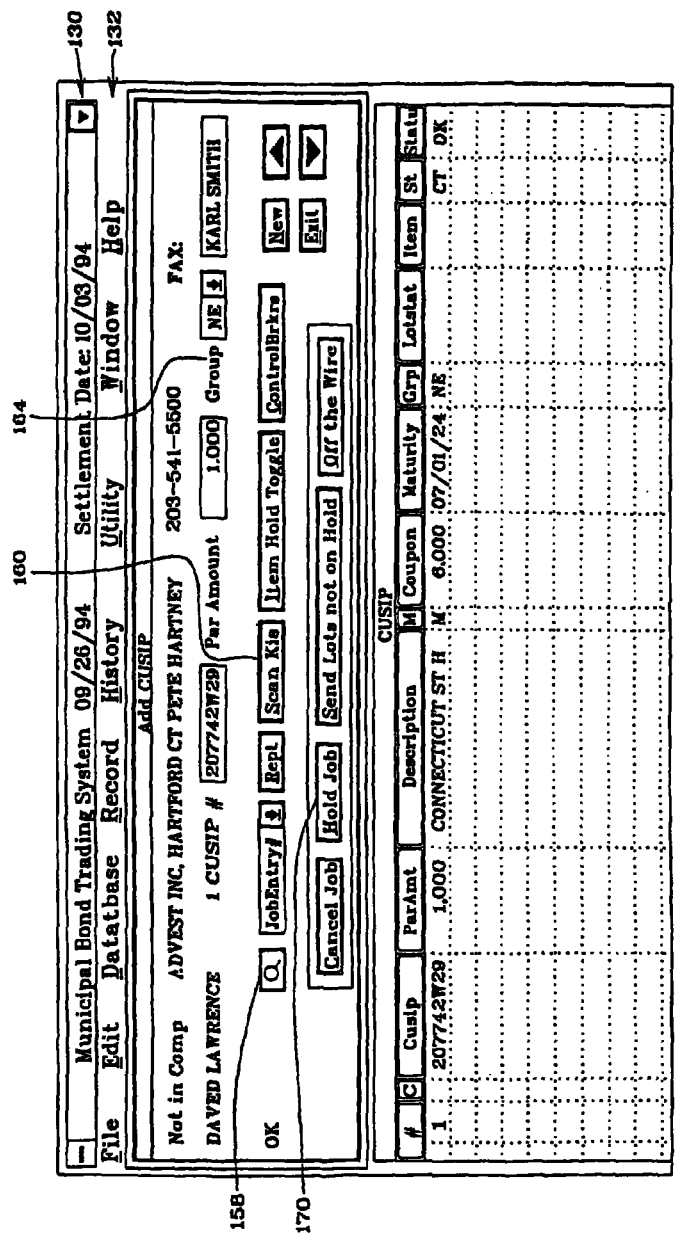
FIG. 6 shows a sample "Add CUSIP" (trademark) information screen for supplementing, or correcting, bond lot information, for use in the modified municipal bond trading system referenced in relation to FIGS. 5 and 6, with lot data entered.

The screens of FIGS. 4-6 show possible embodiments of user interfaces for a slightly modified version of trading system 10. In common with other developmental technical projects, software undergoes various changes and revisions as it evolves from concept to realization. Thus, the screens of FIGS. 4-6 exhibit minor variations from the system as described with reference to FIGS. 2 and 3. Other possible variations will be apparent to those skilled in the art.

The lot entry screen of FIG. 4 can be considered as a modified form of window 80 called down by new job button 62 (FIG. 3). The screen shown has a system header 130 identifying the system loaded, the version number, today's date and a settlement date. Directly beneath system header 130 is a menu bar 132 which differs slightly from ribbon bar 40 of FIG. 2 in that E-mail is not directly available from this screen and a database selection menu is added to permit the use to access various system databases, such as traders, offerings, and so on. With the lot entry screen displayed, only edit, window and help functions are available, these menus are not available.

In the FIG. 4 lot entry screen, the broker can select a trader 134 and brokerage firm 136, referenced on the screen as a "satellite", by setting the respective radio button indicated generally at 138 to sort the selected list. The broker can also select both a selling trader to receive the order and the lot type desired, that is, either a bid wanted, an offering or a dollar bond, via lot-type button 140. The "Not in Comp/In Comp" option 142 allows the broker to notify the trader of the lot to make a higher, that is, more competitive, bid in order to trade or execute the bond lot. "In Comp" means the bid is in competition with a prior bid that the seller of the lot already has. The default for this function is set to "Not in Comp". The individual broker responsible for the lot is identified by name via Choose Broker window 144.

Bid wanteds received back from bidding traders 12 by fax or other means are posted to the trading system 10 using a screen such as that shown in FIG. 5. A new record is created in a bids database which is relational to a lots database, keying on a unique record number (not shown). Referring to FIG. 5, a new bid by bidding trader 12, in this case Jeff Clark, from a hypothetical brokerage firm 136, 1st Albany Corp, is being entered on a lot identified in lot selection box 146 by the host brokerage (broker's broker) as lot "A-1-VA". Jeff Clark is bidding a yield 148 of 4.500 and a concession 150 of 5.000, that is, ½ point, on the lot. If desired, the concession can be selected in concession box 152. The buttons to the left of the trader and brokerage list window provides helpful data entry functions, as indicated by their labels, which are self-explanatory.

Re-enter button 154 recalls the latest record for changes. Other bottom row buttons 154 save the newly created bid to an internal database record unless a cancel option is selected after "quit". The Will Bid and Pass buttons 154 tag the record accordingly with its current status. An upper row of buttons 156 permits existing bid records to be reviewed or acted upon, as indicated by the button labels, are also self-explanatory. Data changes in the will bid/pass records will automatically generate and transmit messages to the traders to that effect reminding them to take appropriate action within the relevant time limit. The lot CUSIP (trademark) number and description appear along the bottom of the screen.

The Add CUSIP (trademark) screen of FIG. 6 can be called up from any desired point in the system when it is desired to consult original reference database records, remotely, or locally, for example from lot data entry window 82 shown in the flowchart in FIG. 3. This screen allows the broker, or broker's clerk, to locate and add a CUSIP (trademark) number and the par amount to incomplete lot information provided that the lot description is adequate to be uniquely matched. The check lot data 84 function shown in FIG. 3 also calls this screen to allow modifications to the data.

Referring to the Add CUSIP (trademark) screen shown in FIG. 6, buttons with labels similar to buttons or menu selections described with reference to FIG. 2 or 3 provide the functions described thereat. The lower half of the screen displays lot information withdrawn from the local or remote reference database. Other functions will be self-explanatory from the button labels. The magnifying-glass icon button 158 initiates a search of the local security master database 24 for records matching the loaded lot. If none is found, remote reference database 22 can be consulted by activating Scan KIS button 160, which may take time. Other functions include a Controlling Bkrs button 162 enabling a controlling broker to be designated or changed. A controlling broker organizes the bidders on the lot and ensures that past bidders have been contacted and advised of time limits for the bids. The program automatically selects the controlling broker based on the geographical location of the lot. Group option 164 enables a broker to reset a group code based on the geographical location of the lot. Job Entry button 166 enables the broker to modify the order in which lots from a job are displayed, by modifying the order of column headers in the listing. Hold job button 170 allows the broker to choose to put a hold on the current job until more suitable market conditions arise, or other delaying factors subside. This option also allows the broker to cancel a hold and resume active status on the job.

FIG. 7 shows a sample system menu selection bar and a partial listing from an offerings database (sorted on maturity date) resident at the broker's office. The details of the listing will be apparent to those skilled in the art, having regard to the foregoing description, but of interest are the records for trader ABC, here marked as "ABC-NY" shown intermingled with records of other traders. The listing is sorted by maturity date.

FIG. 8 shows a similar partial listing of the inventory of ABC including a different branch office, which could be resident at the office of ABC.

Figure 9:
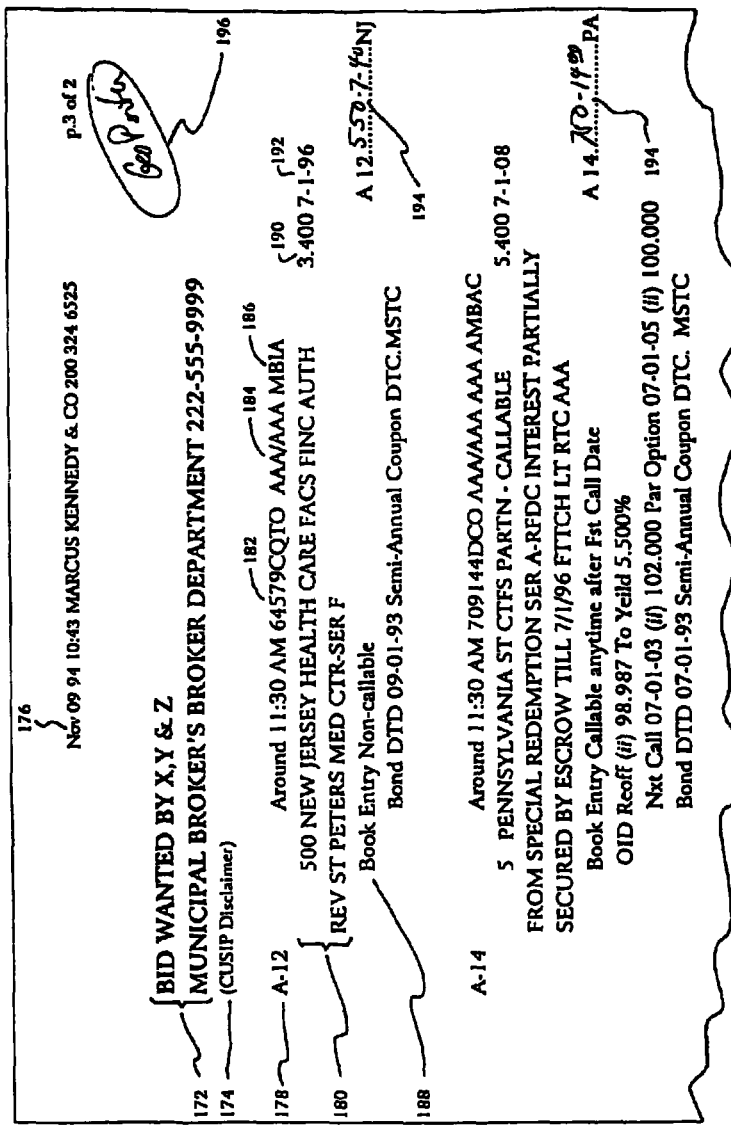
FIG. 9 is a sample completed bid wanted form for use with, and at least partially generated by, the trading system of FIGS. 1-3.

Referring to FIG. 9, the bid wanted form 26 shown therein is suitable for rendering on standard paper, for example letter size, which can list of the order of seven bond lots for bid, of which two are shown. Form 26 comprises a source broker identifying header 172 under which an accreditation 174 of the bond description source (CUSIP) appears along with a disclaimer. Across the top of the form is an electronically posted fax address 176 of the bidding trader 12 to which the bid wanted form 26 is sent. This is useful as it identifies the bidder when the completed bid wanted form 26 is faxed back to the broker. The broker's lot identification number 178 appears to the left of a lot description 180 which is accompanied by complete lot information including CUSIP (trademark) number 182, rating 184, rating agency 186, call information 188, coupon 190 and maturity 192. As completed, a manual bid 194 has been entered in the space provided and the bid is authorized by the trader's signature 196.

Optionally, the municipal bond trading system of this invention can include, or be embodied in, a remote trader module, and allow buying or selling traders to maintain their own inventory records on their personal computers with bond lot information segregated between public and private information. The system maintains local area network inventory records for the trader, while reporting "offers", via modem, to the broker's records, such as those shown in FIG. 8.

The public information to be included in a "street" or publicized offering can comprise the par amount, description and an asking price expressed as a yield, concession or dollar price.

In addition to the public information, a bond lot can be supplied with private information, using the trader module, which private information comprises items such as total position size or par amount, dollars at risk, a hedge price (a price at which to sell futures against the bond lot, an average cost, a profit or loss at the asking price and a sales credit (or commission, for in-house sales staff).

Preferably, the trader is networked with the trading system 10 so that the municipal bond trading system offering database is automatically updated with the public information on a bond lot as this information is posted or updated at the trader's personal computer. The bond lot description and CUSIP (trademark) number can be verified either from security master database 24 or reference database 22, at the broker's facility by the trading system 10, as described herein, and relevant additions or corrections can preferably also be transmitted to the remote trader.

This process of maintaining duplicate records on the trader's hardware, makes tagging an offering and requesting a bid wanted auction a much quicker process, which is another unique and beneficial feature of the invention.

Furthermore, verification of bond lot descriptions against KIS source data by the central trading system 10 enables a trader to work with accurate, verified descriptions, without having to make their own KIS server access arrangements which would be slow and costly for a trader at a facility lacking a security master database which is refreshed nightly.

The inventive municipal bond trading system 10 described herein provides a novel bond lot auction process and a novel bid wanted fax broadcasting process enabling buying traders to be brought together with sellers to trade bond lots in new and valuable ways. Authenticated bid wanteds can be rapidly broadcast to any number of buyers using the fax broadcasting system, according to a timetable specific to each bond lot. The auction process commands attention with its timetable and onscreen alerts and contains the solicitation of bid wanteds in a desired time frame and at the same time enabling any buying trader easily to bid on a lot. More traders are reached more effectively, leading to more and higher bids and quicker sales at better prices for sellers. In addition, full history information is readily available to facilitate future marketing and sales strategies, and in particular, individual traders can be tracked, and their buying or selling histories can be maintained independently of the brokerage firms with which they are associated, so that they can be more effectively serviced when they change firms. Furthermore, by providing a software means to deliver printed bid wanted forms to buying traders, any need for dedicated hardware can be avoided.

It will be understood that the systems and software referenced herein include, either explicitly or implicitly, software implemented on computers or other appropriate hardware, including such other intelligent data processing devices having a processor, data storage means and the ability to support an operating system, with or without user interfaces, for example, file servers, as may be useful in achieving the objectives of this invention.

Software components and applications embodying the invention can be distributed in electronic bit storage on magnetic, optical, bubble or other media, and optionally in transportable form to be interactive with an electronic reading device, for example, on computer or optical diskettes, or may be distributed over wired or wireless networks for storage by the recipient on such media.

Preferred embodiments of the invention provide such media-stored software in a commercial package accompanied by instructions in printed book or booklet form, for deployment of the software on particular embodiments of a general purpose computer to cause same to operate as a special purpose computer, in accordance with the objectives of the invention. License agreements and registration as a means for updating may also be included. Alternatively, the instructions may also be provided as data files.

It will further be appreciated that such media-stored software constitutes an electronic customizing machine which can interact with a magnetically or optically cooperative computer-based input device enabling the computer to be customized as a special purpose computer, according to the contents of the software. To cause a computer to operate in such customized, special-purpose mode, the software of the invention can be installed by a user or some other person, and will usually interact efficiently with the device on which it is resident to provide the desired special-purpose qualities, but only after the selection of a certain set of configuration parameters. When so configured, the special-purpose computer device has an enhanced value, especially to the professional users for whom it is intended.

Also, different fields are maintained for each bond parameter providing the broker, and if so linked, the trader, with the ability to sort bond lots by any such desired parameter.

While some illustrative embodiments of the invention have been described above, it is, of course, understood that various modifications will be apparent to those of ordinary skill in the art. Such modifications are within the spirit and scope of the invention, which is limited and defined only by the appended claims.

Database Table
Sample Database Structures Usable in the Municipal Bond Trading System Described Herein 1. Lots

| 1 | CUS_CHG | C | 1 |
|---|---|---|---|
| 2 | JOBENTRY | N | 5 |
| 3 | ITEMNO | N | 4 |
| 4 | TIMELIMIT | C | 40 |
| 5 | CUSIP | C | 9 |
| 6 | PARAMT | N | 6 |
| 7 | GROUP | C | 2 |
| 8 | STATE | C | 2 |
| 9 | STATUS | C | 15 |
| 10 | ITEMSTAT | C | 4 |
| 11 | COUPON | N | 7 |
| 12 | MATURITY | D | 8 |
| 13 | DESC | C | 40 |
|  | Total |  | 144 |

2. Bids

| 25 | Yield | N* | 5 |
|---|---|---|---|
| 26 | Concession | N* | 6 |
| 26a | Concession Plus | N* | 6 |
| 27 | Dollar | N* | 8 |
| 28 | Gross Dollar Price | N* | 9 |
| 29 | Net Dollar Price | N* | 9 |
| 30 | Net Yield | N* | 5 |
| 31 | Net Yld To Call | N* | 5 |
| 32 | Net Yld To Par Option | N* | 5 |
| 33 | Net Yld To Sink'g Fund | N* | 5 |
| 34 | Specification | C | 15 |
| 36 | Cover | N* | 6 |
| 37 | # Posit's Of Bidder | N* | 2 |
| 38 | Out By | N* | 6 |
| 51 | Bidder | C | 10 |
| 52 | Trader At Bidder | C | 20 |
| 53 | Posted | C | 6 |
| 54 | Inputter | C | 6 |

N* = calculated

3. Customer Master

| 1 | Customer Code | C | 11 |
|---|---|---|---|
| 2 | Security Dealer | C | 30 |
| 3 | Addr1 | C | 30 |
| 4 | Addr2 | C | 30 |
| 5 | City | C | 30 |
| 6 | State | C | 2 |
| 7 | Zip | C | 10 |
| 8 | Exchange Assoc. | C | 12 |
| 9 | Clear through | C | 25 |
| 10 | DTC | C | 4 |
| 11 | NSCC | C | 4 |
| 12 | Tax I.D. | C | 10 |
| 13 | Tel | C | 14 |
| 14 | Fax | C | 14 |

4. Trader Master

| 1 | Trader Code | C | 6 |
|---|---|---|---|
| 2 | First | C | 15 |
| 3 | Last | C | 15 |
| 4 | Title | C | 12 |
| 5 | Sal | C | 12 |
| 6 | Telno1 | C | 18 |
| 7 | Telno2 | C | 18 |
| 8 | Faxno1 | C | 18 |
| 9 | Faxno2 | C | 18 |
| 10 | Dept. | C | 12 |
| 11 | Interests | C | 30 |
| 12 | History | C | 20 |
| 13 | Memo | M |  |

5. Firm Master

| 1 | Customer code | C | 11 |
|---|---|---|---|
| 2 | Firm | C | 30 |
| 3 | Addr1 | C | 30 |
| 4 | Addr2 | C | 30 |
| 5 | City | C | 30 |
| 6 | State | C | 2 |
| 7 | Zip | C | 10 |
| 8 | Exchange Assoc. | C | 12 |
| 9 | Clear through | C | 25 |
| 10 | DTC | C | 4 |
| 11 | NSCC | C | 4 |
| 12 | Tax I.D. | C | 10 |
| 13 | Main Tel | C | 14 |
| 14 | Main Fax | C | 14 |
| 15 | P&S Name | C | 30 |
| 16 | P&S Tel | C | 14 |
| 17 | P&S Fax | C | 14 |
| 15 | P&S Name | C | 30 |
| 16 | P&S Tel | C | 14 |
| 17 | P&S Fax | C | 14 |
| 18 | Buy Contracts Name | C | 30 |
| 19 | Buy Contracts Tel | C | 14 |

What is claimed is:

1. A method comprising:
receiving by at least one computing system from a selling trader via a selling trader computer in use by the selling trader a command to access a database of bond lots, wherein the computing system is communicatively coupled to the selling trader computer via a communications network;
in response to receiving the command, transmitting by the computing system to the selling trader computer a plurality of bond lots from the database of bond lots;
receiving by the computing system from the selling trader computer information that identifies at least one bond lot from the transmitted plurality of bond lots, wherein the identified bond lot comprises a bond lot on which the selling trader wants to solicit bids;
based at least in part on receiving the information, transmitting by the computing system to a plurality of bidding traders via respective bidding trader computers in use by the plurality of bidding traders a bid wanted for at least the identified bond lot, wherein the computing system and the bidding trader computers are communicatively coupled via the communications network;

in response to transmitting the bid wanted, receiving by the computing system from at least a portion of the plurality of bidding traders via respective bidding trader computers bids on at least the identified bond lot;

identifying a high bid from the received bids; and transmitting by the computing system to the selling trader computer at least the identified high bid;

wherein the selling trader is able to accept at least one of the received bids; and wherein an acceptance by the selling trader of a received bid on the identified bond lot results in a trade of the identified bond lot between the selling trader and at least the bidding trader that submitted the accepted bid.

2. The method of claim 1, wherein transmitting at least the identified high bid comprises transmitting by the computing system to the selling trader computer an ordered list of received bids, wherein the order list includes the identified high bid.

3. The method of claim 2, wherein the ordered list of received bids transmitted to the selling trader computer is ordered by at least one of yield and price.

4. The method of claim 1, wherein each of the received bids is not disclosed to other bidding traders.

5. The method of claim 1, wherein the transmitted plurality of bond lots is sorted by maturity dates of the bonds associated with the respective plurality of bond lots.

6. The method of claim 1, wherein transmitting the plurality of bond lots comprises transmitting to the selling trader computer at least one item of data for each of the plurality of bond lots.

7. The method of claim 6, wherein for at least one of the transmitted plurality of bond lots, the at least one item of data comprises at least one item of market data associated with the at least one transmitted bond lot.

8. The method of claim 6, wherein for each respective one of the transmitted plurality of bond lots, the at least one item of data comprises at least one of:
    a coupon value of the bond associated with the respective bond lot,
    a maturity date of the bond associated with the respective bond lot,
    an issuer of the bond associated with the respective bond lot, and
    yield data associated with the respective bond lot.

9. The method of claim 1, wherein at least one of the bond lots of the transmitted plurality of bond lots comprises a bond lot being offered for sale and that has not yet traded.

10. The method of claim 1,
    wherein the command comprises that includes at least one search criteria;
    wherein the method further comprises:
        in response to receiving the query, searching by the computing system the database of bond lots based on the at least one search criteria; and
    wherein transmitting the plurality of bond lots comprises transmitting by the computing system to the selling trader computer the bond lots that match the at least one search criteria.

11. The method of claim 1, further comprising:
    incorporating by the computing system into the bid wanted at least one item of data associated with the identified bond lot.

12. The method of claim 11, wherein the at least one item of data comprises at least one of:
    a unique issue identification number for the bond associated with the identified bond lot,
    a maturity date of the bond associated with the identified bond lot,
    a value of the identified bond lot at par,
    a coupon value of the bond associated with the identified bond lot,
    an issuer of the bond associated with the identified bond lot, and
    an identification number for the identified bond lot.

13. The method of claim 1, further comprising:
    based at least in part on the information received from the selling trader computer, determining by the computing system at least one further item of data associated with the identified bond lot; and
    incorporating by the computing system into the bid wanted the at least one further item of data.

14. The method of claim 13, wherein the at least one further item of data comprises a unique issue identification number for the bond associated with the identified bond lot.

15. The method of claim 1,
    wherein the method further comprises accessing by the computing system a predetermined list that specifies bidding traders that are to receive the bid wanted, wherein the predetermined list includes the plurality of bidding traders; and
    wherein transmitting the bid wanted to the plurality of bidding traders comprises transmitting the bid wanted to each of the plurality of bidding traders based at least in part on the respective bidding trader being on the predetermined list.

16. The method of claim 1,
    wherein the method further comprises accessing by the computing system a predetermined destination list that specifies brokerage firms that are to receive the bid wanted, wherein the predetermined destination list includes the plurality of bidding traders; and
    wherein transmitting the bid wanted to the plurality of bidding traders comprises transmitting the bid wanted to each of the plurality of bidding traders based at least in part on the respective bidding trader being on the predetermined destination list.

17. An apparatus comprising:
    at least one processor; and
    a memory electronically coupled to the at least one processor, wherein the memory stores software that when executed by the at least one processor, directs the at least one processor to:
    receive from a selling trader via a selling trader computer in use by the selling trader a command to access a database of bond lots, wherein the apparatus is operable to communicate with the selling trader computer via a communications network;
    in response to receiving the command, transmit to the selling trader computer a plurality of bond lots from the database of bond lots;
    receive from the selling trader computer information that identifies at least one bond lot from the transmitted plurality of bond lots, wherein the identified bond lot comprises a bond lot on which the selling trader wants to solicit bids;
    based at least in part on receiving the information, transmit to a plurality of bidding traders via respective bidding trader computers in use by the plurality of bidding traders a bid wanted for at least the identified bond lot, wherein the apparatus is further operable to communicate with the bidding trader computers via the communications network;

in response to transmitting the bid wanted, receive from at least a portion of the plurality of bidding traders via respective bidding trader computers bids on at least the identified bond lot;

identify a high bid from the received bids; and transmit to the selling trader computer at least the identified high bid;

wherein the selling trader is able to accept at least one of the received bids; and wherein an acceptance by the selling trader of a received bid on the identified bond lot results in a trade of the identified bond lot between the selling trader and at least the bidding trader that submitted the accepted bid.

18. The apparatus of claim 17, wherein to transmit at least the identified high bid comprises to transmit to the selling trader computer an ordered list of received bids, wherein the order list includes the identified high bid.

19. The apparatus of claim 18, wherein the ordered list of received bids transmitted to the selling trader is ordered by at least one of yield and price.

20. The apparatus of claim 17, wherein each of the received bids is not disclosed to other bidding traders.

21. The apparatus of claim 17, wherein the transmitted plurality of bond lots is sorted by maturity dates of the bonds associated with the respective plurality of bond lots.

22. The apparatus of claim 17, wherein to transmit the plurality of bond lots comprises to transmit to the selling trader computer at least one item of data for each of the plurality of bond lots.

23. The apparatus of claim 22, wherein for at least one of the transmitted plurality of bond lots, the at least one item of data comprises at least one item of market data associated with the at least one transmitted bond lot.

24. The apparatus of claim 22, wherein for each respective one of the transmitted plurality of bond lots, the at least one item of data comprises at least one of:
- a coupon value of the bond associated with the respective bond lot,
- a maturity date of the bond associated with the respective bond lot,
- an issuer of the bond associated with the respective bond lot, and
- yield data associated with the respective bond lot.

25. The apparatus of claim 17, wherein at least one of the bond lots of the transmitted plurality of bond lots comprises a bond lot being offered for sale and that has not yet traded.

26. The apparatus of claim 17,
wherein the command comprises a query that includes at least one search criteria;
wherein the software, when executed by the at least one processor, further directs the at least one processor to:
in response to receiving the query, search the database of bond lots based on the at least one search criteria; and
wherein to transmit the plurality of bond lots comprises to transmit to the selling trader computer the bond lots that match the at least one search criteria.

27. The apparatus of claim 17, wherein the software, when executed by the at least one processor, further directs the at least one processor to incorporate into the bid wanted at least one item of data associated with the identified bond lot.

28. The apparatus of claim 27, wherein the at least one item of data comprises at least one of:
- a unique issue identification number for the bond associated with the identified bond lot,
- a maturity date of the bond associated with the identified bond lot,
- a value of the identified bond lot at par,
- a coupon value of the bond associated with the identified bond lot,
- an issuer of the bond associated with the identified bond lot, and
- an identification number for the identified bond lot.

29. The apparatus of claim 17, wherein the software, when executed by the at least one processor, further directs the at least one processor to:
based at least in part on the information received from the selling trader computer, determine at least one further item of data associated with the identified bond lot; and
incorporate into the bid wanted the at least one further item of data.

30. The apparatus of claim 29, wherein the at least one further item of data comprises a unique issue identification number for the bond associated with the identified bond lot.

31. The apparatus of claim 17,
wherein the software, when executed by the at least one processor, further directs the at least one processor to access a predetermined list that specifies bidding traders that are to receive the bid wanted, wherein the predetermined list includes the plurality of bidding traders; and
wherein to transmit the bid wanted to the plurality of bidding traders comprises to transmit the bid wanted to each of the plurality of bidding traders based at least in part on the respective bidding trader being on the predetermined list.

32. The apparatus of claim 17,
wherein the software, when executed by the at least one processor, further directs the at least one processor to access a predetermined destination list that specifies brokerage firms that are to receive the bid wanted, wherein the predetermined destination list includes the plurality of bidding traders; and
wherein to transmit the bid wanted to the plurality of bidding traders comprises to transmit the bid wanted to each of the plurality of bidding traders based at least in part on the respective bidding trader being on the predetermined destination list.

33. The method of claim 1, further comprising receiving by the computing system from the selling trader via the selling trader computer an acceptance of a received bid on the identified bond lot.

34. The method of claim 1, wherein transmitting the plurality of bond lots comprises displaying by the computing system to the selling trader at the selling trader computer the plurality of bond lots.

35. The method of claim 1, wherein the received information comprises at least one of:
- an identification number for the identified bond lot,
- a unique issue identification number for the bond associated with the identified bond lot,
- a maturity date of the bond associated with the identified bond lot,
- a coupon value of the bond associated with the identified bond lot,
- an issuer of the bond associated with the identified bond lot, and
- a value of the identified bond lot at par.

36. The method of claim 1, wherein the transmitted plurality of bond lots only comprises bond lots that are being offered for sale by the selling trader through the computing system and that have not yet traded.

37. The method of claim 1,
wherein the received information comprises at least one item of data; and
wherein the method further comprises:
accessing by the computing system at least one database to obtain a version of the at least one item of data;
determining by the computing system that the at least one item of data does not match the version of the at least one item of data obtained from the at least one database; and
based at least in part on determining that the at least one item of data does not match the version of the at least one item of data obtained from the at least one database, incorporating by the computing system into the bid wanted the version of the at least one item of data obtained from the at least one database.

38. The method of claim 1,
wherein the received information comprises at least one item of data; and
wherein the method further comprises:
verifying by the computing system that the at least one item of data is current and/or correct; and
based at least in part on verifying that the at least one item of data is current and/or correct, incorporating by the computing system into the bid wanted the at least one item of data.

39. The method of claim 1,
wherein the bid wanted includes a deadline;
wherein bidding traders must submit bids on at least the identified bond lot prior to the deadline for such bids to be considered; and
wherein the method further comprises:
prior to an expiration of the deadline, displaying by the computing system to at least one of the plurality of bidding traders at the bidding trader computer in use by the at least one bidding trader at least one message, wherein the at least one message comprises an alert to the at least one bidding trader of the approaching deadline.

40. The method of claim 1,
wherein the method further comprises receiving by the computing system a plurality of bond offerings offering to sell respective bond lots;
wherein the database of bond lots comprises the bond lots associated with the plurality of bond offerings; and
wherein transmitting the plurality of bond lots comprises:
in response to receiving the command, transmitting to the selling trader computer at least a portion of the bond lots associated with the plurality of bond offerings.

41. The method of claim 40, wherein the transmitted plurality of bond lots only comprises bond lots, associated with the plurality of bond offerings, that are being offered for sale by the selling trader.

42. The method of claim 1,
wherein the method further comprises:
receiving by the computing system from the selling trader via the selling trader computer a request to solicit bids for at least the identified bond lot; and
wherein transmitting the bid wanted comprises:
based at least in part on receiving the request to solicit bids, transmitting by the computing system to the plurality of bidding traders the bid wanted for at least the identified bond lot.

43. The method of claim 10,
wherein the database of bond lots comprises bond lots being offered for sale; and
wherein the at least one search criteria includes a criteria to obtain from the database of bond lots only those bond lots being offered for sale by the selling trader.

44. The method of claim 11, wherein the at least one item of data comprises at least one of:
a unique issue identification number for the bond associated with the identified bond lot, and
an identification number for the identified bond lot.

45. The method of claim 11, wherein the at least one item of data comprises at least one of:
a rating of the bond associated with the identified bond lot,
a rating agency that made the rating,
an indication of whether the bond associated with the identified bond lot is callable by an issuer of the bond, and
an indication of whether the bond associated with the identified bond lot has been called by the issuer of the bond.

46. The method of claim 11, wherein the at least one item of data comprises at least a portion of the information received from the selling trader computer.

47. The method of claim 46, wherein the at least one item of data received from the selling trader computer and incorporated into the bid wanted comprises at least one of:
an identification number for the identified bond lot,
a unique issue identification number for the bond associated with the identified bond lot,
a maturity date of the bond associated with identified bond lot,
a coupon value of the bond associated with the identified bond lot,
an issuer of the bond associated with the identified bond lot, and
a value of the identified bond lot at par.

48. The method of claim 13, wherein the at least one further item of data comprises at least one of:
a rating of the bond associated with the identified bond lot,
a rating agency that made the rating,
an indication of whether the bond associated with the identified bond lot is callable by an issuer of the bond, and
an indication of whether the bond associated with the identified bond lot has been called by the issuer of the bond.

49. The method of claim 48, wherein the information received from the selling trader computer comprises at least one of:
an identification number for the identified bond lot;
a unique issue identification number for the bond associated with the identified bond lot;
a maturity date of the bond associated with identified bond lot;
a coupon value of the bond associated with the identified bond lot;
an issuer of the bond associated with the identified bond lot; and
a value of the identified bond lot at par.

50. The method of claim 49, further comprising incorporating by the computing system into the bid wanted at least a portion of the information received from the selling trader computer.

51. The apparatus of claim 17, wherein the software, when executed by the at least one processor, further directs the at least one processor to receive from the selling trader via the selling trader computer an acceptance of a received bid on the identified bond lot.

52. The apparatus of claim 17, wherein to transmit the plurality of bond lots comprises to display to the selling trader at the selling trader computer the plurality of bond lots.

53. The apparatus of claim 17, wherein the received information comprises at least one of:
an identification number for the identified bond lot,
a unique issue identification number for the bond associated with the identified bond lot,
a maturity date of the bond associated with the identified bond lot,
a coupon value of the bond associated with the identified bond lot,
an issuer of the bond associated with the identified bond lot, and
a value of the identified bond lot at par.

54. The apparatus of claim 17, wherein the transmitted plurality of bond lots only comprises bond lots that are being offered for sale by the selling trader through the apparatus and that have not yet traded.

55. The apparatus of claim 17,
wherein the received information comprises at least one item of data; and
wherein the software, when executed by the at least one processor, further directs the at least one processor to:
access at least one database to obtain a version of the at least one item of data;
determine that the at least one item of data does not match the version of the at least one item of data obtained from the at least one database; and
based at least in part on determining that the at least one item of data does not match the version of the at least one item of data obtained from the at least one database, incorporate into the bid wanted the version of the at least one item of data obtained from the at least one database.

56. The apparatus of claim 17,
wherein the received information comprises at least one item of data; and
wherein the software, when executed by the at least one processor, further directs the at least one processor to:
verify that the at least one item of data is current and/or correct; and
based at least in part on verifying that the at least one item of data is current and/or correct, incorporate into the bid wanted the at least one item of data.

57. The apparatus of claim 17,
wherein the bid wanted includes a deadline;
wherein bidding traders must submit bids on at least the identified bond lot prior to the deadline for such bids to be considered; and
wherein the software, when executed by the at least one processor, further directs the at least one processor to:
prior to an expiration of the deadline, display to at least one of the plurality of bidding traders at the bidding trader computer in use by the at least one bidding trader at least one message, wherein the at least one message comprises an alert to the at least one bidding trader of the approaching deadline.

58. The apparatus of claim 17,
wherein the software, when executed by the at least one processor, further directs the at least one processor to receive a plurality of bond offerings offering to sell respective bond lots;
wherein the database of bond lots comprises the bond lots associated with the plurality of bond offerings; and
wherein to transmit the plurality of bond lots comprises to:
in response to receiving the command, transmit to the selling trader computer at least a portion of the bond lots associated with the plurality of bond offerings.

59. The apparatus of claim 58, wherein the transmitted plurality of bond lots only comprises bond lots, associated with the plurality of bond offerings, that are being offered for sale by the selling trader.

60. The apparatus of claim 17,
wherein the software, when executed by the at least one processor, further directs the at least one processor to:
receive from the selling trader via the selling trader computer a request to solicit bids for at least the identified bond lot; and
wherein to transmit the bid wanted comprises to:
based at least in part on receiving the request to solicit bids, transmit to the plurality of bidding traders the bid wanted for at least the identified bond lot.

61. The apparatus of claim 26,
wherein the database of bond lots comprises bond lots being offered for sale; and
wherein the at least one search criteria includes a criteria to obtain from the database of bond lots only those bond lots being offered for sale by the selling trader.

62. The apparatus of claim 27, wherein the at least one item of data comprises at least one of:
a unique issue identification number for the bond associated with the identified bond lot, and
an identification number for the identified bond lot.

63. The apparatus of claim 27, wherein the at least one item of data comprises at least one of:
a rating of the bond associated with the identified bond lot,
a rating agency that made the rating,
an indication of whether the bond associated with the identified bond lot is callable by an issuer of the bond, and
an indication of whether the bond associated with the identified bond lot has been called by the issuer of the bond.

64. The apparatus of claim 27, wherein the at least one item of data comprises at least a portion of the information received from the selling trader computer.

65. The apparatus of claim 64, wherein the at least one item of data received from the selling trader computer and incorporated into the bid wanted comprises at least one of:
an identification number for the identified bond lot,
a unique issue identification number for the bond associated with the identified bond lot,
a maturity date of the bond associated with identified bond lot,
a coupon value of the bond associated with the identified bond lot,
an issuer of the bond associated with the identified bond lot, and
a value of the identified bond lot at par.

66. The apparatus of claim 29, wherein the at least one further item of data comprises at least one of:
a rating of the bond associated with the identified bond lot,
a rating agency that made the rating,
an indication of whether the bond associated with the identified bond lot is callable by an issuer of the bond, and
an indication of whether the bond associated with the identified bond lot has been called by the issuer of the bond.

67. The apparatus of claim 66, wherein the information received from the selling trader computer comprises at least one of:
an identification number for the identified bond lot;
a unique issue identification number for the bond associated with the identified bond lot;

a maturity date of the bond associated with identified bond lot;

a coupon value of the bond associated with the identified bond lot;

an issuer of the bond associated with the identified bond lot; and a value of the identified bond lot at par.

68. The apparatus of claim 67, wherein the software, when executed by the at least one processor, further directs the at least one processor to incorporate into the bid wanted at least a portion of the information received from the selling trader computer.

\* \* \* \* \*